United States Patent
Tsuchida et al.

(10) Patent No.: US 11,186,419 B2
(45) Date of Patent: Nov. 30, 2021

(54) LIDDED CONTAINER

(71) Applicant: DAI NIPPON PRINTING CO., LTD., Tokyo (JP)

(72) Inventors: Masako Tsuchida, Tokyo (JP); Takashi Kado, Tokyo (JP); Katsumi Yano, Tokyo (JP)

(73) Assignee: Dai Nippon Printing Co., Ltd., Tokyo (JP)

( * ) Notice: Subject to any disclaimer, the term of this patent is extended or adjusted under 35 U.S.C. 154(b) by 376 days.

(21) Appl. No.: 16/303,772

(22) PCT Filed: May 24, 2017

(86) PCT No.: PCT/JP2017/019408
§ 371 (c)(1),
(2) Date: Nov. 21, 2018

(87) PCT Pub. No.: WO2017/204257
PCT Pub. Date: Nov. 30, 2017

(65) Prior Publication Data
US 2020/0180835 A1    Jun. 11, 2020

(30) Foreign Application Priority Data

May 25, 2016 (JP) .............................. JP2016-104644
Sep. 26, 2016 (JP) .............................. JP2016-187503

(51) Int. Cl.
*B65D 77/20* (2006.01)
*B32B 27/08* (2006.01)

(52) U.S. Cl.
CPC ......... *B65D 77/2032* (2013.01); *B32B 27/08* (2013.01); *B65D 2543/00296* (2013.01);
(Continued)

(58) Field of Classification Search
CPC ............ B65D 77/2032; B65D 77/2024; B65D 77/2028; B65D 77/2096; B65D 2543/00425
See application file for complete search history.

(56) References Cited

U.S. PATENT DOCUMENTS

| | | | | |
|---|---|---|---|---|
| 4,605,142 A | * | 8/1986 | Itoh .................... | B65D 77/2036 220/260 |
| 4,693,391 A | * | 9/1987 | Roth .................. | B65D 77/2036 220/359.2 |

(Continued)

FOREIGN PATENT DOCUMENTS

| JP | 04-112064 | 9/1992 |
|---|---|---|
| JP | 2538189 | 6/1997 |

(Continued)

OTHER PUBLICATIONS

International Search Report, issued in the corresponding PCT application No. PCT/JP2017/019408, dated Aug. 22, 2017, 5 pages.

(Continued)

*Primary Examiner* — Andrew T Kirsch
(74) *Attorney, Agent, or Firm* — Hamre, Schumann, Mueller & Larson, P.C.

(57) ABSTRACT

A lidded container, which enables contents to be poured from a specific part, is provided. A closing seal portion joining a lid to a flange portion of a container comprises: a main seal portion having a first end and a second end; and a projecting seal portion having one end and the other end connected to the first end and the second end of the main seal portion and projecting toward the opening of the container. A width of a leading end portion which is a portion of the projecting seal portion, which is closest to a center point of the opening of the container, is smaller than a width of an opposing portion which is a portion of the main seal portion, which intersects with a center line passing through the (Continued)

leading end portion of the projecting seal portion and the center point of the opening of the container.

9 Claims, 24 Drawing Sheets

(52) U.S. Cl.
CPC .............. *B65D 2543/00537* (2013.01); *B65D 2577/205* (2013.01); *B65D 2577/2066* (2013.01)

(56) References Cited

U.S. PATENT DOCUMENTS 5,516,035 A * 5/1996 Stone ................. B65D 77/2032
229/123.2
2012/0241455 A1 9/2012 Scholvinck et al.

FOREIGN PATENT DOCUMENTS

| JP | 2013-147292 | 8/2013 |
| JP | 2015-009051 | 1/2015 |

OTHER PUBLICATIONS

First Chinese Office Action, issued in the corresponding Chinese patent application No. 201780031747.5, dated Sep. 2, 2019, 10 pages.

* cited by examiner

LIDDED CONTAINER

BACKGROUND OF THE INVENTION

Field of the Invention

The present invention relates to a lidded container including a container having an opening formed therein and a lid joined to the container by a closing seal portion so as to cover the opening. More particularly, the present invention relates to a lidded container configured to be deformed by an external force applied to a bottom surface or side surface of the container, thereby raise the pressure inside the container, and consequently partially separate the closing seal portion.

Background Art

In the prior art, lidded containers which contain contents having fluidity such as a liquid or a powder in a plastic container and are sealed with a lid formed from a film or the like are widely marketed. Particularly small ones of such lidded containers are also referred to as portions, potion containers, potion cups, and the like. Small lidded containers are used to contain various contents such as gum syrup, creamer, seasoning, and concentrated beverage.

As one form of a lidded container, for example, as disclosed in Patent Literature 1, there has been known a lidded container of a type configured to be deformed by an external force applied to a bottom surface or side surface of the container, thereby raise the pressure inside the container, and consequently partially separate the closing seal portion. According to such a lidded container, for example, the closing seal portion is separated by pressing the side surface or the bottom surface of the container with one hand, whereby the contents can be taken out. Thus, the contents can be easily taken out as compared with a lidded container of a type in which the lid needs to be removed with one hand while the container is held with the other hand. In addition, it is possible to prevent the contents from sticking to the hand when separating the closing seal portion. As disclosed in Patent Literature 1, a lidded container containing a concentrated beverage is set in a device such as a dilution beverage production device, and the bottom surface and the side surface of the container are pressed using the device, whereby a beverage of a desired concentration can be produced.

In the lidded container disclosed in Patent Literature 1, a portion of the annular closing seal portion for joining the lid to a flange portion of the container serves as a projecting seal portion projecting radially inward of an opening of the container. In this case, when the pressure inside the container rises, the projecting seal portion separates prior to other portions of the closing seal portion. Thus, a user can predict from which position of the opening the contents are likely to be discharged.

CITATION LIST

Patent Literature

Patent Literature 1: JP 2015-9051 A

SUMMARY OF THE INVENTION

When the external force is applied to the side surface of the container to deform the container and thus to raise the pressure inside the container, it is considered that the force tending to separate the closing seal portion is strongly generated at an end of the closing seal portion in a direction orthogonal to the direction of the external force in the closing seal portion. Thus, it is preferable that the projecting seal portion be provided at one of the two ends where the force tending to separate the closing seal portion is strongly generated.

On the other hand, since the force tending to separate the seal portion is also strongly generated at the other end of the closing seal portion, that is, a portion of the closing seal portion which faces the projecting seal portion, this portion may separate prior to the projecting seal portion. As a result, there is a possibility that the contents are discharged from the lidded container in a position not intended by the user.

It is an object of the present invention to provide a lidded container which can effectively solve such a problem.

The present invention provides a lidded container including a container having a bottom surface, a side surface standing upright from the bottom surface and defining an opening, and a flange portion continuously connected to an upper portion of the side surface so as to surround the opening, a lid covering the opening of the container, and a closing seal portion located between an upper surface of the flange portion of the container and a lower surface of the lid and joining the lid to the flange portion of the container, wherein the closing seal portion includes a main seal portion having a first end and a second end and a projecting seal portion having one end connected to the first end of the main seal portion and the other end connected to the second end of the main seal portion and projecting toward the opening of the container, and a width of a leading end portion which is a portion of the projecting seal portion, which is closest to a center point of the opening of the container, is smaller than a width of an opposing portion which is a portion of the main seal portion, which intersects with a center line passing through the leading end portion of the projecting seal portion and the center point of the opening of the container.

In the lidded container according to the present invention, a difference between the width of the leading end portion and the width of the opposing portion may be not less than 2 mm.

In the lidded container according to the present invention, when a seal portion in a case where it is assumed that the main seal portion is virtually extended from the first end to the second end of the main seal portion based on a direction in which the main seal portion extends in the first end and the second end of the main seal portion is referred to as a virtual seal portion, a distance between an inner edge of a portion of the virtual seal portion which intersects with the center line and an inner edge of the leading end portion of the projecting seal portion may be smaller than a width of the opposing portion of the main seal portion.

In the lidded container according to the present invention, when a portion of the projecting seal portion in which a distance between opposing outer edges of the projecting seal portion in a direction orthogonal to the center line is 5 mm is referred to as an intermediate portion, a distance between an inner edge of the leading end portion of the projecting seal portion and the intermediate portion of the projecting seal portion in a direction in which the center line extends may be smaller than the width of the opposing portion of the main seal portion.

In the lidded container according to the present invention, a cutout, a step portion, or a through hole is formed in the flange portion of the container at a position outside the projecting seal portion, and a distance between an inner edge of the leading end portion of the projecting seal portion and the cutout, the step portion, or the through hole of the container in the direction in which the center line extends may be smaller than the width of the opposing portion of the main seal portion. The step portion may extend in a direction in which the center line passing through the leading end portion of the projecting seal portion and the center point of the opening of the container extends. In a plan view, the projecting seal portion may be in contact with the step portion.

The lidded container according to the present invention may further include a pair of regulating seal portions provided so as to sandwich the center line, passing through the leading end portion of the projecting seal portion and the center point of the opening of the container, in a plan view and connected to a portion of the closing seal portion.

In the lidded container according to the present invention, the side surface of the container may have a thickness of not less than 100 μm and not more than 500 μm.

In the present invention, the closing seal portion joining the lid to the flange portion of the container includes a main seal portion having a first end and a second end and a projecting seal portion having one end connected to the first end of the main seal portion and the other end connected to the second end of the main seal portion and projecting toward the opening of the container. When a portion of the projecting seal portion which is closest to the center point of the opening of the container is defined as a leading end portion and a portion of the main seal portion which intersects with the leading end portion of the projecting seal portion and the center line passing through the center point of the opening of the container is defined as an opposing portion, the width of the leading end portion is smaller than the width of the opposing portion. For this reason, it is possible to suppress that the inside of the container communicates with the outside in a portion other than the projecting seal portion, whereby it is possible to suppress that the contents are discharged from the lidded container at an unintended position.

DETAILED DESCRIPTION OF THE INVENTION

An embodiment of the present invention will be described below with reference to FIGS. 1 to 6. The entirety of a lidded container 10 in this embodiment will be first described with reference to FIGS. 1 to 3.

(Lidded Container)

Figure 1:
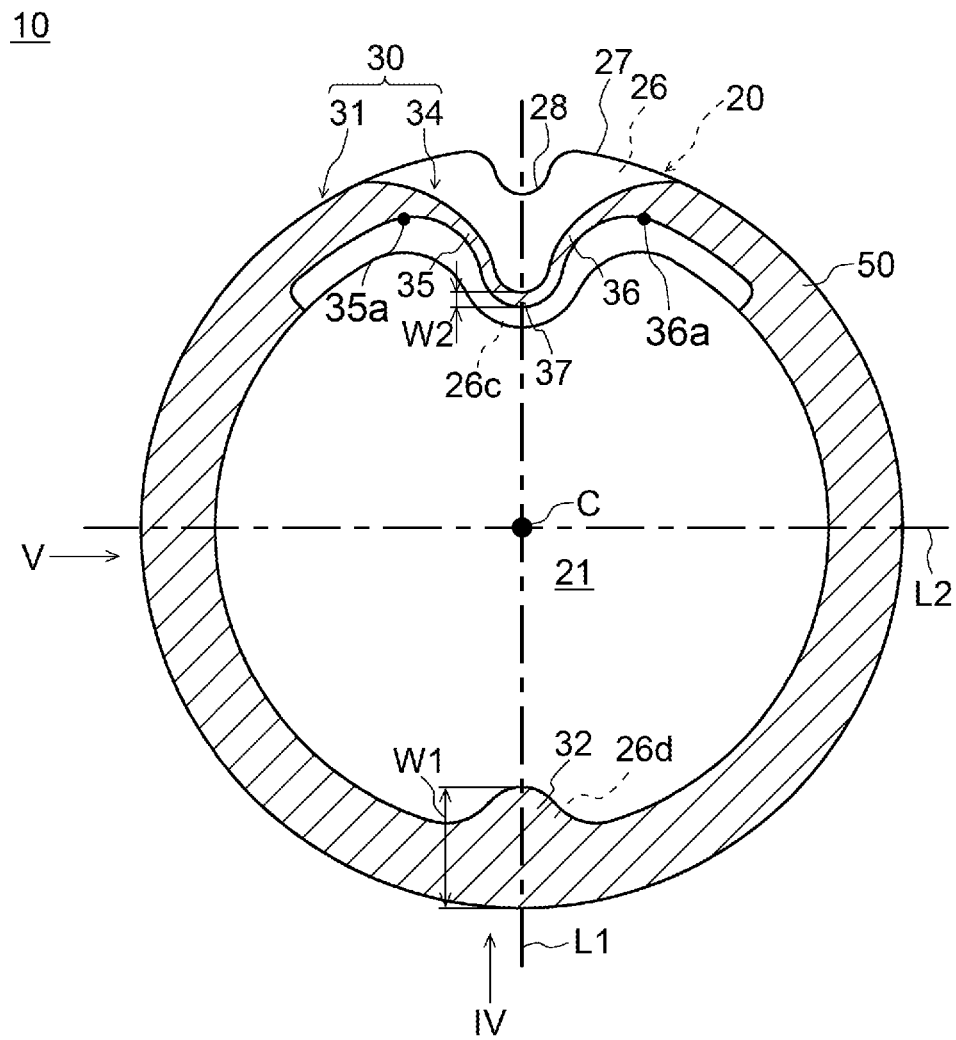
FIG. 1 is a plan view showing a lidded container of an embodiment of the present invention.
Figure 2:
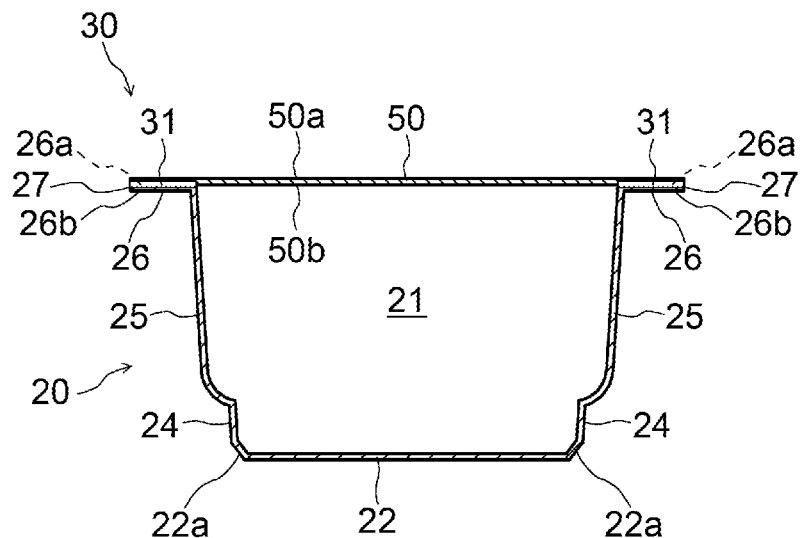
FIG. 2 is a cross-sectional view taken along a second center line of the lidded container of FIG. 1.
Figure 3:
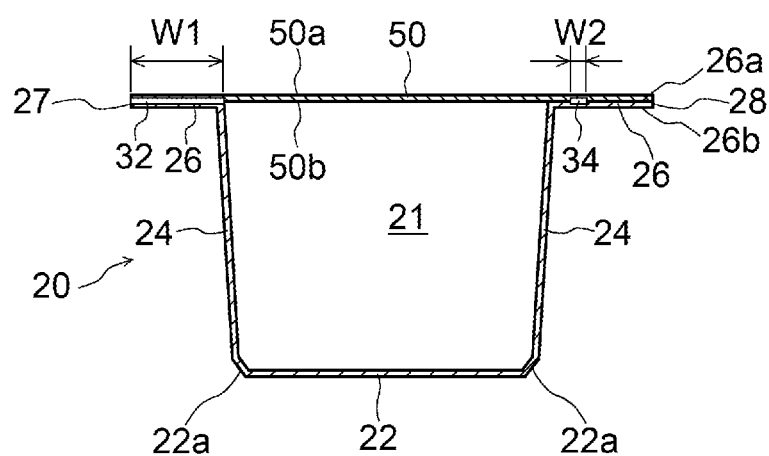
FIG. 3 is a cross-sectional view taken along a first center line of the lidded container of FIG. 1.

FIG. 1 is a plan view showing a lidded container 10. FIGS. 2 and 3 are longitudinal cross-sectional views taken along a first center line L1 and a second center line L2 of the lidded container 10 of FIG. 1. The lidded container 10 includes a container 20 having an opening 21 formed therein, a lid 50 covering the opening 21 of the container 20, and a closing seal portion 30 joining the lid 50 to the container 20. In FIG. 1, constituent elements of the container 20 covered with the lid 50, such as the opening 21 and a flange portion 26 to be described later, are indicated by dotted lines. The first center line L1 is a straight line passing through a center point C of the opening 21 of the container 20 in a plan view and a leading end portion 37 of the projecting seal portion 34 of the closing seal portion 30 to be described later. The second center line L2 is a straight line that is orthogonal to the first center line L1 and passes through the center point C of the opening 21 of the container 20 in a plan view. The center point C is the center of gravity of the opening 21, and in the present embodiment, the center point C is defined as the center point of a circle virtually drawn so as to circumscribe an outer edge of the opening 21 in a plan view.

(Container)

Next, the container 20 will be described. As shown in FIGS. 1 to 3, the container 20 has a bottom surface 22, a side surface 24 which stands upright from the bottom surface 22 so as to spread over one circumference along an outer edge of the bottom surface 22, and a flange portion 26 which is continuously connected to an upper portion of the side surface 24. The side surface 24 defines the opening 21 of the container 20 in a plan view. The flange portion 26 is continuously connected to the upper portion of the side surface 24 so as to surround the opening 21 and extends outward horizontally. The lid 50 described above is joined to an upper surface 26a of the flange portion 26 of the container 20. In the present specification, terms such as "side surface", "upper portion", "upper surface", "lower surface", and "horizontal direction" indicate the positions and directions of the lidded container 10, the container 20, the lid 50, and constituent elements thereof based on a state in which the lidded container 10 and the container 20 are placed such that the bottom surface 22 of the container 20 is located below.

FIGS. 1 to 3 show an example in which the bottom surface 22 and the side surface 24 of the container 20 are configured such that the opening 21 has a substantially circular contour in a plan view. However, the shape of the container 20 is not particularly limited as long as the desired contents can be contained in the container 20. For example, the opening 21 may have a rectangular or polygonal contour in a plan view. The contour of the bottom surface 22 and the contours of the flange portion 26 and the lid 50 may or may not be similar to each other.

The content to be contained in the container 20 is not particularly limited as long as it is one having fluidity such as a liquid, a viscous body, or a powder. As a feature of the lidded container 10 according to the present embodiment, the lid 50 can be partially peeled off from the flange portion 26 of the container 20 by pressing the side surface 24 and the bottom surface 22 of the container 20 with one hand. For this reason, it is preferable to use a content contained in the container 20 having a small capacity enough to be pressed with one hand. For example, a content such as gum syrup, creamer, seasoning, or concentrated beverage is preferably contained in the container 20. A gel-like content such as jelly may be contained in the container 20. The container 20 having a small capacity means that the dimension of the opening 21 in a plan view is not more than 60 mm, more preferably not more than 20 mm.

As shown in FIG. 1, the flange portion 26 may include a projecting portion 26c projecting toward the center point C of the opening 21 in a plan view. In other words, the side surface 24 may include a recess recessed toward the center point C of the opening 21. A projecting seal portion 34, to be described later, of the closing seal portion 30 is at least partially located on the projecting portion 26c.

As shown in FIG. 1, the flange portion 26 may further include a projecting portion projecting toward the center point C of the opening 21 in a plan view in addition to the projecting portion 26c in which the projecting seal portion 34 is located. For example, as shown in FIG. 1, the flange portion 26 may include a projecting portion 26d provided at a position facing the projecting portion 26c with the center point C interposed therebetween in the direction in which the first center line L1 extends.

Figure 4:
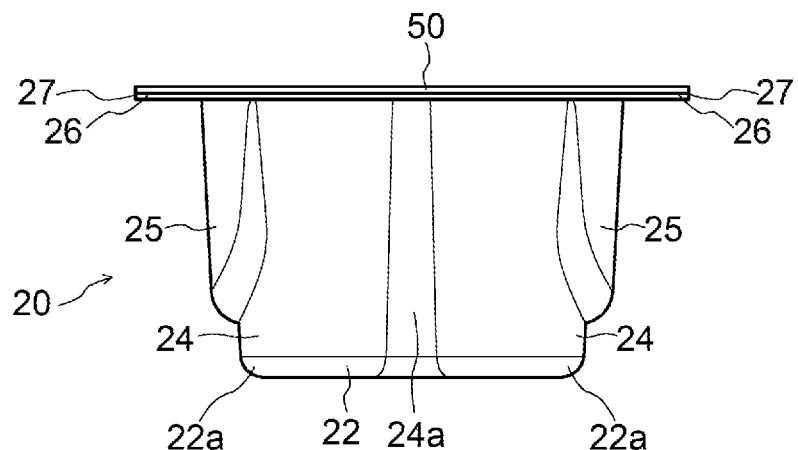
FIG. 4 is a front view of the lidded container of FIG. 1 as viewed along an arrow IV.

Hereinafter, the shape of the container 20 will be further described with reference to FIGS. 4 and 5 in addition to FIGS. 1 to 3. FIG. 4 is a front view of the lidded container 10 of FIG. 1 as viewed along an arrow IV, and FIG. 5 is a side view of the lidded container 10 of FIG. 1 as viewed along an arrow V.

Figure 5:
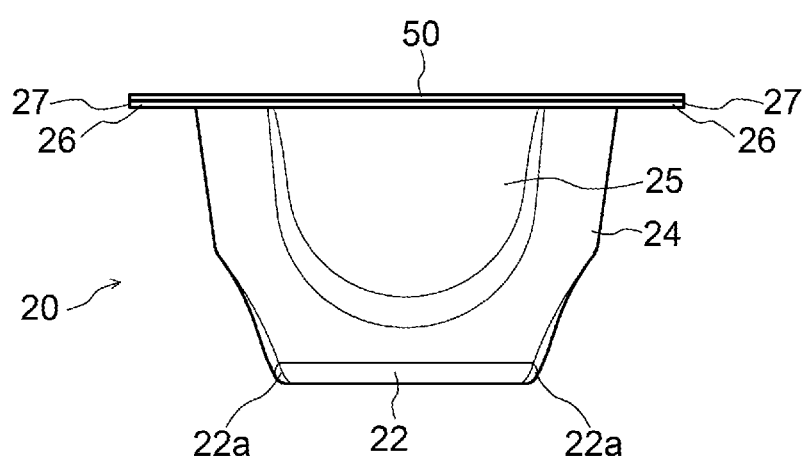
FIG. 5 is a side view of the lidded container of FIG. 1 as viewed along an arrow V.

As shown in FIGS. 4 and 5, the side surface 24 may be provided with a pair of bulging portions 25 bulging outward. The pair of bulging portions 25 is arranged so as to sandwich the first center line L1 therebetween and to intersect with the second center line L2. When the bulging portion 25 thus configured is provided, a user can easily apply an external force to the side surface 24 of the container 20.

(Closing Seal Portion)

Next, the closing seal portion 30 will be described. As shown in FIG. 1, the closing seal portion 30 is an annular seal portion which extends continuously over one circumference so as to surround the opening 21 of the container 20 in a plan view. As shown in FIGS. 2 and 3, the closing seal portion 30 is located between the upper surface 26a of the flange portion 26 of the container 20 and a lower surface 50b of the lid 50. The lower surface 50b of the lid 50 is joined to the upper surface 26a of the flange portion 26 of the container 20 by the closing seal portion 30.

In this specification, the term "joining" is a concept including both welding and bonding. The term "welding" means that the closing seal portion 30 is configured by at least partially melting at least one of the container 20 and the lid 50. The term "adhesion" means that the closing seal portion 30 is constituted of a separate constituent element from the container 20 and the lid 50, such as an adhesive. Although FIGS. 2 and 3 show an example in which the closing seal portion 30 is formed to straddle both the lid 50 and the flange portion 26, the present invention is not limited to this example. For example, the closing seal portion 30 may be formed only on the lid 50 side, or may be formed only on the flange portion 26 side. In the plan views of FIG. 1 and FIGS. 6 to 10, 12, 15, 16, etc. to be described later, the closing seal portion 30 is hatched.

As shown in FIG. 1, the closing seal portion 30 extending annularly so as to surround the opening 21 includes a main seal portion 31 and the projecting seal portion 34. The projecting seal portion 34 is a seal portion projecting toward the opening 21 in the closing seal portion 30. In the present embodiment, the projecting seal portion 34 is at least partially located on the projecting portion 26c of the flange portion 26. The main seal portion 31 is a seal portion of the closing seal portion 30 other than the projecting seal portion 34, and is provided along the opening 21 in the present embodiment.

Each of the main seal portion 31 and the projecting seal portion 34 has one end and the other end. One end (first end) of the main seal portion 31 and one end of the projecting seal portion 34 are connected to each other at a first maximum point 35a. The other end (second end) of the main seal portion 31 and the other end of the projecting seal portion 34 are connected to each other at a second maximum point 36a to be described later. In other words, the main seal portion 31 and the projecting seal portion 34 are distinguished with the first maximum point 35a and the second maximum point 36a as boundaries. The definition of the first maximum point 35a and the second maximum point 36a will be described later.

The projecting seal portion 34 includes a first projecting seal portion 35 and a second projecting seal portion 36 arranged so as to sandwich the leading end portion 37 therebetween. The leading end portion 37 is a portion of the projecting seal portion 34, which is closest to the center point C in a plan view of the opening 21 of the container 20.

As shown in FIG. 1, particularly the leading end portion 37 of the projecting seal portion 34 is closer to the center point C of the opening 21 than the main seal portion 31. In this case, when an external force is applied to the bottom surface 22 or the side surface 24 of the container 20, for example, to raise the pressure inside the container 20, particularly the leading end portion 37 of the projecting seal portion 34 separates prior to the main seal portion 31, so that the lid 50 is peeled from the flange portion 26 at the position of the leading end portion 37.

In FIG. 1, reference numeral 32 denotes an opposing portion of the main seal portion 31, which faces the leading end portion 37 of the projecting seal portion 34. The opposing portion 32 is defined as a portion of the main seal portion 31 which intersects with the first center line L1. In the present embodiment, the opposing portion 32 is located on the projecting portion 26d facing the projecting portion 26c where the leading end portion 37 is located. Reference symbol W1 represents the width of the opposing portion 32. The width W1 of the opposing portion 32 is the dimension of the opposing portion 32 in the direction along the first center line L1. The width W1 of the opposing portion 32 is, for example, not less than 3 mm and not more than 20 mm.

As shown in FIG. 1, a cutout 28 extending from an outer edge 27 of the flange portion 26 toward the opening 21 may be formed at a position outside the projecting seal portion 34 of the outer edge 27 of the flange portion 26. The cutout 28 may be formed so as to be at least partially tapered toward the opening 21. Preferably, the cutout 28 intersects with the first center line L1 in a plan view. More preferably, a portion of the cutout 28, which is closest to the opening 21, intersects with the first center line L1 in a plan view.

Figure 6:
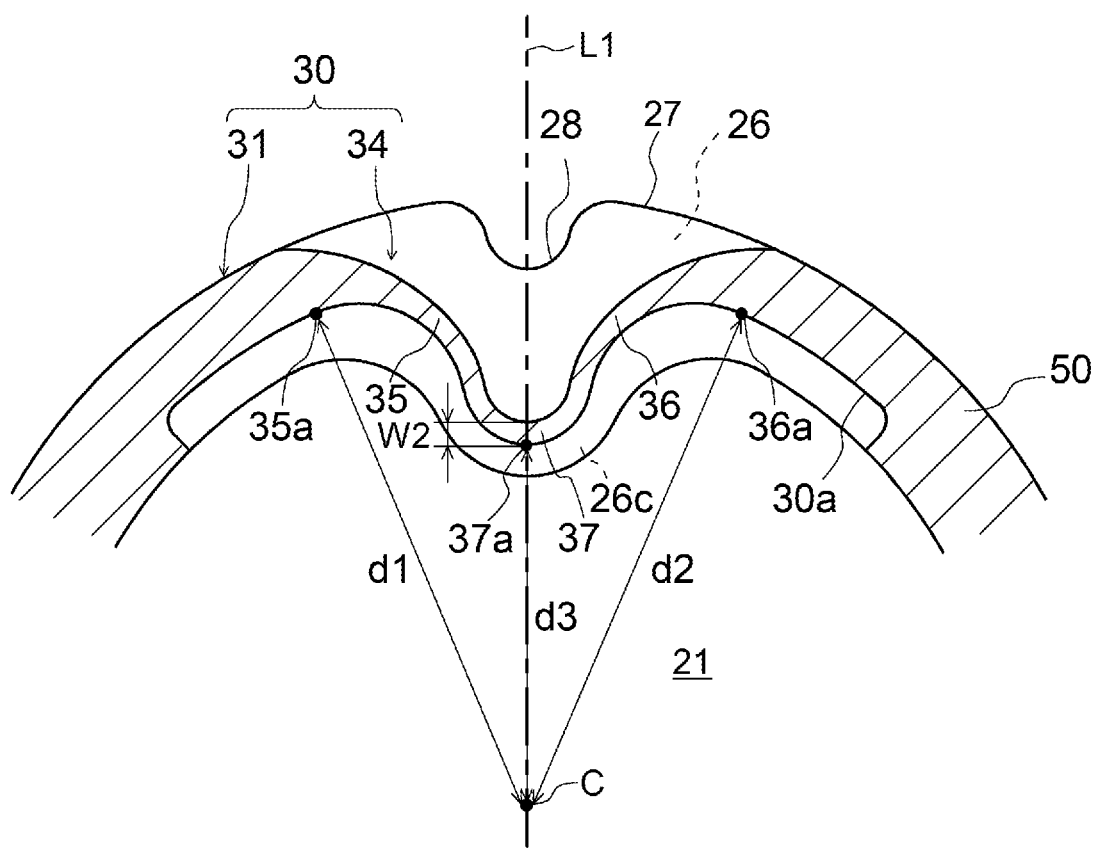
FIG. 6 is an enlarged plan view of a projecting seal portion of a closing seal portion of the lidded container of FIG. 1.

Next, the projecting seal portion 34 will be described in detail with reference to FIG. 6. FIG. 6 is an enlarged plan view of the projecting seal portion 34 of the closing seal portion of 30 the lidded container 10 of FIG. 1.

First, the definition of the projecting seal portion 34 will be described. In the present embodiment, the projecting seal portion 34 refers to a portion indicating a change where when a distance from the inner edge of the closing seal portion 30 to the center point C of the opening 21 is measured clockwise at each position of the closing seal portion 30, the distance indicates a first maximum value and is then reduced to become a minimum value, and then the distance increases to indicate a second maximum value. In FIG. 6, among points on the inner edge of the closing seal portion 30, the first maximum point indicating the first maximum value, a minimum point indicating the minimum value, and the second maximum point indicating the second maximum value are denoted by reference numerals 35a, 37a, and 36a, respectively. The leading end portion 37 of the projecting seal portion 34 is a portion including the minimum point 37a of the closing seal portion 30. The first projecting seal portion 35 is a portion of the closing seal portion 30 which extends from the first maximum point 35a to the leading end portion 37. On the other hand, the second projecting seal portion 36 is a portion of the closing seal portion 30 which extends from the second maximum point 36a to the leading end portion 37. The inner edge of the closing seal portion 30 means an edge of the closing seal portion 30, which is located on the opening 21 side. On the other hand, the outer edge of the closing seal portion 30 is an edge of the closing seal portion 30, which is located on the opposite side of the inner edge.

A difference between a distance d1 from the first maximum point 35a to the center point C of the opening 21 and a distance d3 from the minimum point 37a to the center point C of the opening 21 is, for example, not less than 5 mm. A difference between a distance d2 from the second maximum point 36a to the center point C of the opening 21 and the distance d3 is, for example, not less than 5 mm.

In the present embodiment, as shown in FIG. 1, around the opposing portion 32, with respect to a distance between an inner edge of the main seal portion 31 and the center point C of the opening 21, similarly to the projecting seal portion 34, the first maximum value, the minimum value, and the second maximum value appear. As described above, when the closing seal portion 30 has a plurality of portions where the first maximum value, the minimum value, and the second maximum value appear, the projecting seal portion 34 is defined as a portion of the closing seal portion 30 in which the difference between the distance d1 and the distance d3 and the difference between the distance d2 and the distance d3 are largest.

In FIG. 1, reference symbol W2 represents a width of the leading end portion 37 of the projecting seal portion 34. The width W2 of the leading end portion 37 is the dimension of the leading end portion 37 in the direction along the first center line L1. The width W2 of the leading end portion 37 is, for example, not less than 0.5 mm and not more than 3 mm.

In the present embodiment, the width W2 of the leading end portion 37 of the projecting seal portion 34 is smaller than the width W1 of the opposing portion 32 of the main seal portion 31. For example, a difference between the width W2 of the leading end portion 37 and the width W1 of the opposing portion 32 is not less than 2 mm. W2/W1 which is the width W1 of the opposing portion 32 of the main seal portion 31 with respect to the width W2 of the leading end portion 37 of the projecting seal portion 34 is not less than 0.02 and not more than 0.4.

(Materials for Container and Lid)

Hereinafter, an example of materials constituting the container 20 and the lid 50 will be described.

As the material constituting the container 20, it is possible to use plastics such as polypropylene, polystyrene, and polyethylene terephthalate. The thickness of the side surface 24 of the container 20 formed of plastic is preferably set such that the container 20 can be easily deformed when an external force is applied. For example, the thickness of the side surface 24 of the container 20 is not less than 100 μm and not more than 500 μm and more preferably not less than 100 μm and not more than 300 μm. In particular, the thickness of the flange portion 26 of the container 20 is set such that the flange portion 26 can be easily bent starting from the cutout 28 or a step portion, a through hole, or the like to be described later. For example, the thickness of the flange portion 26 of the container 20 is not less than 300 μm and not more than 700 μm.

The thickness of the flange portion 26 is usually larger than the thickness of the side surface 24.

A material constituting the lid 50 is selected such that the lower surface 50b of the lid 50 can be joined to the upper surface 26a of the flange portion 26 of the container 20. For example, the lid 50 includes a base material layer and a sealant layer constituting the lower surface 50b of the lid 50. The thickness of the lid 50 is, for example, not less than 20 μm and not more than 100 μm.

As a material constituting the base material layer, a polyester type resin such as polyethylene terephthalate, a polyamide type resin such as nylon, polypropylene, or the like can be used. As a material constituting the sealant layer, polypropylene, a mixed resin of polypropylene and polyethylene, or the like can be used. A mixed resin of polypropylene and polyethylene is a material having a relatively small joining force, which is also called an easy peel sealant. When both the base material layer and the sealant layer contain polypropylene, biaxially oriented polypropylene is used in the base material layer, and non-oriented polypropylene is used in the sealant layer.

(Method of Manufacturing Lidded Container)

Next, an example of a method of manufacturing the lidded container 10 will be described.

First, the container 20 having the bottom surface 22, the side surface 24 and the flange portion 26 integrally formed is formed by an injection molding method. Then, the lid 50 is placed on the upper surface 26a of the flange portion 26 of the container 20. Thereafter, a portion of the lid 50 where the closing seal portion 30 is to be formed is heated from an upper surface 50a side using a hot plate or the like to melt the sealant layer of the lid 50. Thereby, it is possible to weld the lower surface 50b of the lid 50 to the upper surface 26a of the flange portion 26 of the container 20 with the closing seal portion 30 interposed therebetween. Thereafter, the flange portion 26 is punched out to form the cutout 28. At this time, a cutout corresponding to the cutout 28 of the container 20 is formed also in the lid 50.

As a method of producing the container 20, in addition to the injection molding method described above, a known method such as a sheet molding method can be used as appropriate. Before the lid 50 is joined to the container 20, the cutout 28 may be formed in the flange portion 26. In this case, the lid 50 may cover the cutout 28 of the container 20.

(Method of Opening Lidded Container)

Next, an example of a method of opening the lidded container 10 will be described.

First, a user applies an external force to the side surface 24 of the container 20 so as to sandwich the first center line L1. For example, the pair of bulging portions 25 of the side surface 24 is pressed inward of the container 20. At this time, the user may press the pair of bulging portions 25 with one hand or press with both hands.

As the container 20 deforms, the internal volume of the container 20 decreases, which results in an increase in the pressure inside the container 20. This creates a force tending to peel the lid 50 from the flange portion 26 of the container 20, that is, a force tending to separate the closing seal portion 30 between the lid 50 and the flange portion 26. The term "separation" is a concept including the case where the closing seal portion 30 is peeled from the flange portion 26, the case where the closing seal portion 30 is peeled off from the lid 50, and the case where the closing seal portion 30 is broken so as to partially remain on both the flange portion 26 side and the lid 50 side.

When the user applies the external force to the side surface 24 of the container 20 so as to sandwich the first center line L1, the force tending to separate the closing seal portion 30 is strongly generated particularly in a portion of the closing seal portion 30 which intersects with the first center line L1. That is, the force tending to separate the closing seal portion 30 is strongly generated particularly at the opposing portion 32 of the main seal portion 31 and the leading end portion 37 of the projecting seal portion 34. Here, in the present embodiment, as described above, the width W2 of the leading end portion 37 is smaller than the width W1 of the opposing portion 32. Thus, it is possible to suppress that the opposing portion 32 separates prior to the leading end portion 37. Accordingly, the leading end portion 37 is separated prior to the other portions of the closing seal portion 30, and it is possible to form a gap between the flange portion 26 of the container 20 and the lid 50 at the position of the leading end portion 37. This allows the contents to be taken out from the lidded container at an intended position, that is, at the position of the projecting seal portion 34.

When the contents are raw materials for beverages and cooked goods such as gum syrup, creamer, seasoning, and concentrated beverage, the contents are taken out, for example, toward dishes and cooking utensils. If the contents are those that the user can directly eat, such as jelly, the contents may be taken out toward the mouth of the user. For example, the user applies a force to the side surface 24 of the container 20 in a state in which a portion of the container 20 corresponding to the leading end portion 37 of the projecting seal portion 34 is brought close to the mouth. As a result, the user can take out the contents toward the mouth at the intended position.

Incidentally, when the lid 50 is likely to come into close contact with the flange portion 26 of the container 20, even if the leading end portion 37 of the projecting seal portion 34 is separated, a gas filled in the container 20 may not be properly discharged to the outside. In this case, since the pressure inside the container 20 remains high, separation of the closing seal portion 30 progresses from the leading end portion 37 toward the outer edge 27 of the flange portion 26. Also in the opposing portion 32 facing the leading end portion 37, separation of the opposing portion 32 may progress from the inner edge of the opposing portion 32 toward the outer edge. Thereafter, when the gap between the flange portion 26 and the lid 50 is sufficiently enlarged, the inside of the container 20 can communicate with the outside via the gap, whereby the pressure inside the container 20 is lowered. Here, according to the present embodiment, the difference between the width W2 of the leading end portion 37 and the width W1 of the opposing portion 32 is not less than 8 mm. Thus, it is possible to suppress that the opposing portion 32 completely separates before separation of the closing seal portion 30 progresses from the leading end portion 37 toward the outer edge 27 of the flange portion 26 and the gap between the flange portion 26 and the lid 50 is sufficiently enlarged. Thus, it is possible to suppress that the contents are discharged from the lidded container at the position of the opposing portion 32.

In order to suppress that the contents are discharged from the lidded container at the position of the opposing portion 32, it is more preferable that the following conditions be satisfied with respect to the closing seal portion 30.

(First Preferred Condition)

Figure 7:
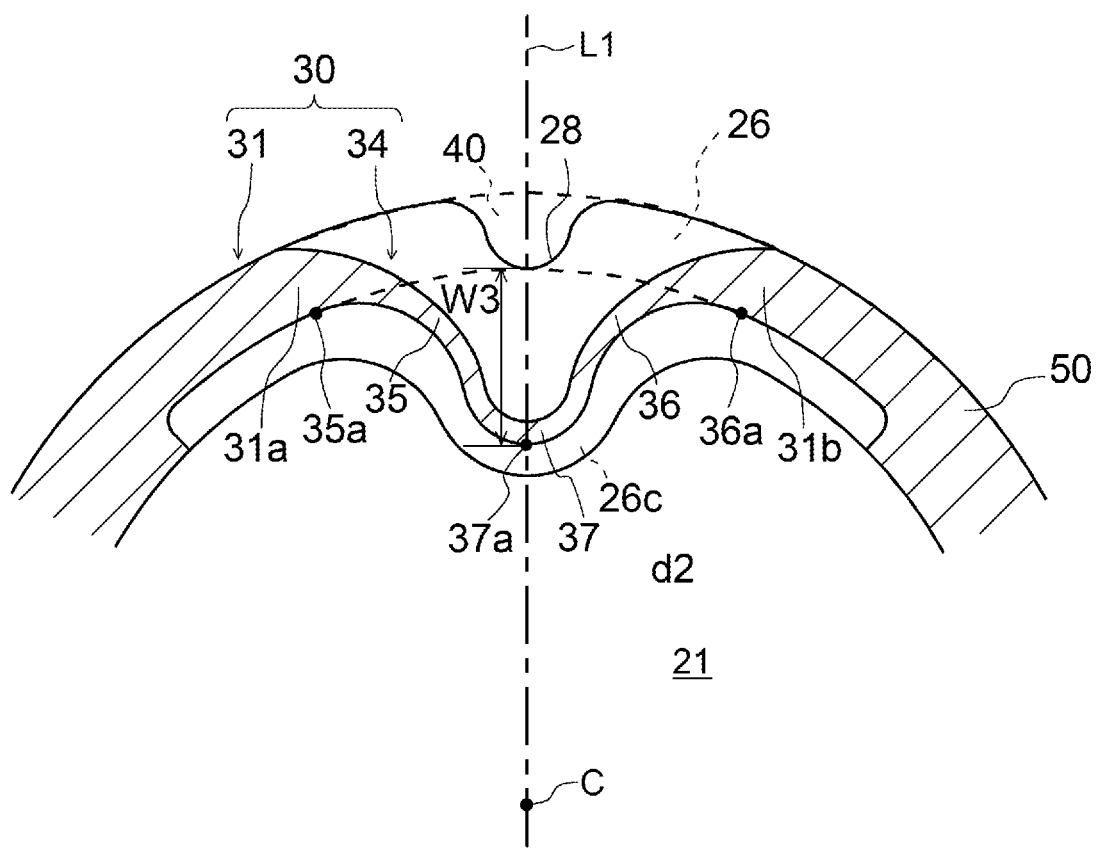
FIG. 7 is an enlarged plan view of the lidded container satisfying a first preferred condition.

FIG. 7 is a view for explaining a first preferred condition, and is an enlarged plan view showing the projecting seal portion 34. In FIG. 7, a portion 40 sandwiched between two dotted lines is a seal portion (hereinafter referred to as a virtual seal portion) when it is assumed that the main seal portion 31 is virtually extended from a first end 31a to a second end 31b of the main seal portion 31 based on a direction in which the main seal portion 31 extends in the first end 31a and the second end 31b of the main seal portion 31. Reference symbol W3 represents a distance between an inner edge of a portion of a virtual seal portion 40, which intersects with the first center line L1, and an inner edge of the leading end portion 37 of the projecting seal portion 34.

As the first preferred condition, it is proposed to make the distance W3 smaller than the width W1 of the opposing portion 32 of the main seal portion 31. As a result, prior to progression of separation of the main seal portion 31 from the inner edge of the opposing portion 32 to the outer edge, progression of separation of the projecting seal portion 34 from the leading end portion 37 to the first maximum point 35a and the second maximum point 36a is facilitated. This allows the inside of the container 20 to be communicated with the outside on the projecting seal portion 34 side before the opposing portion 32 completely separates, whereby the pressure inside the container 20 can be lowered. Accordingly, it is possible to suppress that the opposing portion 32 completely separates to discharge the contents from the lidded container at the position of the opposing portion 32.

(Second Preferred Condition)

Figure 8:
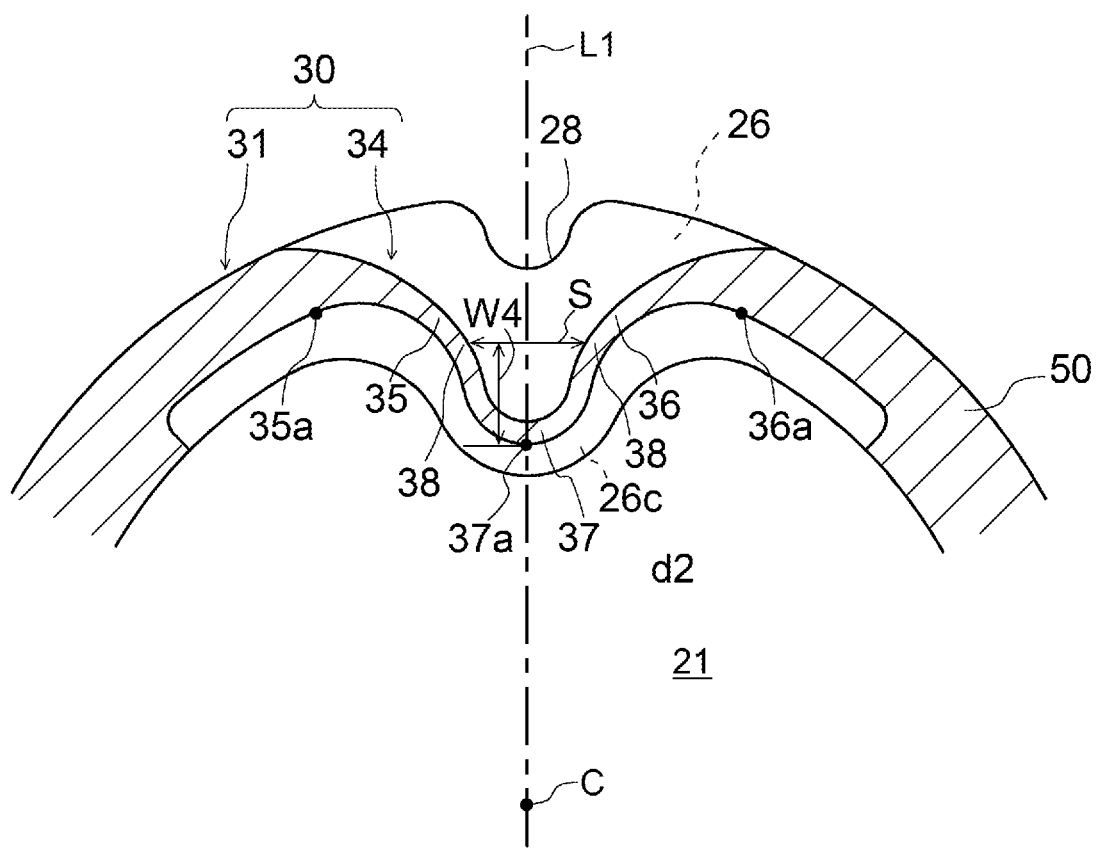
FIG. 8 is an enlarged plan view of the lidded container satisfying a second preferred condition.

FIG. 8 is a view for explaining a second preferred condition, and is an enlarged plan view showing the projecting seal portion 34. In FIG. 8, reference numeral 38 represents a portion (hereinafter referred to as an intermediate portion) in which a distance between opposing outer edges of the projecting seal portion 34 in a direction orthogonal to the first center line L1 is S. The distance S is, for example, 5 mm. Reference symbol W4 represents a distance between the inner edge of the leading end portion 37 of the projecting seal portion 34 and the intermediate portion 38 of the projecting seal portion 34 in the direction in which the first center line L1 extends.

As the second preferred condition, it is proposed to make the distance W4 smaller than the width W1 of the opposing portion 32 of the main seal portion 31. As a result, prior to progression of separation of the main seal portion 31 from the inner edge of the opposing portion 32 to the outer edge, a width of a gap formed between the lid 50 and the flange portion 26 by separation of the projecting seal portion 34 on the projecting seal portion 34 side can be made not less than the distance S described above. Thus, a suitable setting of the distance S allows the inside of the container 20 to be communicated with the outside on the projecting seal portion 34 side before the opposing portion 32 completely separates, whereby the pressure inside the container 20 can be lowered. Accordingly, it is possible to suppress that the opposing portion 32 completely separates to discharge the contents from the lidded container at the position of the opposing portion 32.

(Third Preferred Condition)

Figure 9:
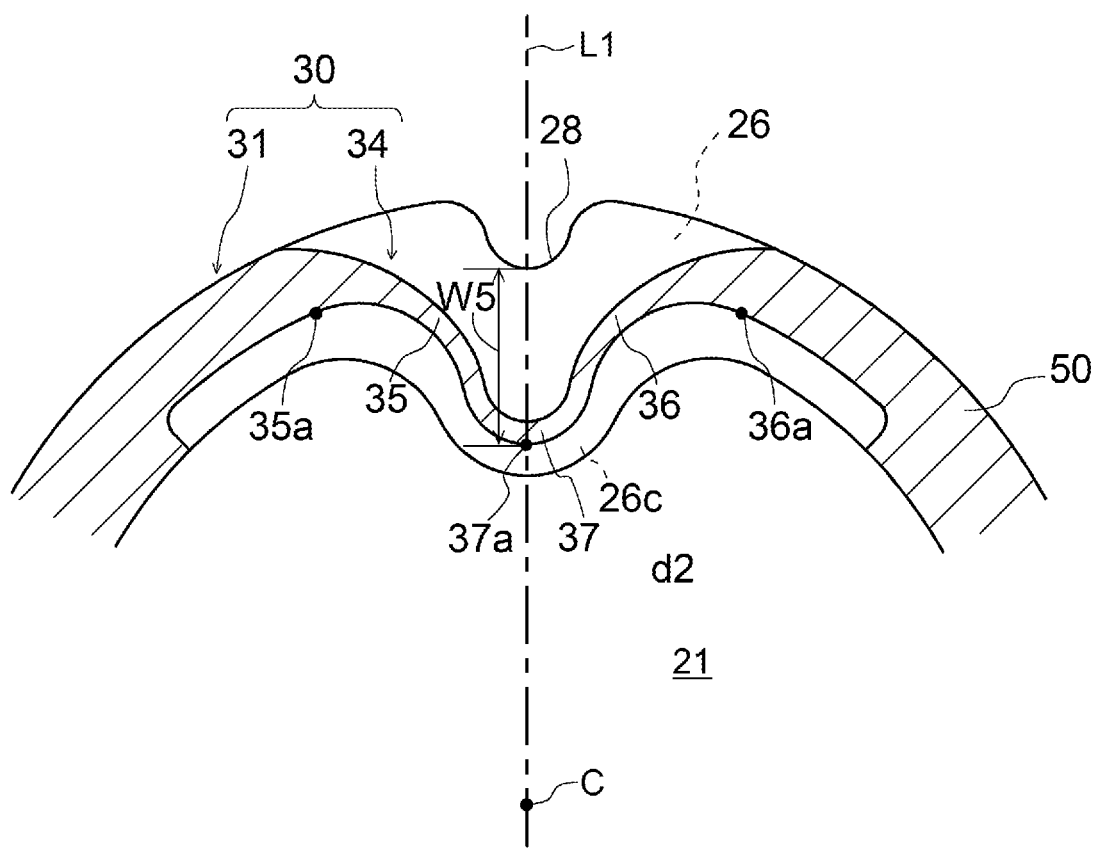
FIG. 9 is an enlarged plan view of the lidded container satisfying a third preferred condition.

FIG. 9 is a view for explaining a third preferred condition, and is an enlarged plan view showing the projecting seal portion 34. In FIG. 9, reference symbol W5 represents a distance between the inner edge of the leading end portion 37 of the projecting seal portion 34 and the cutout 28 in the direction in which the first center line L1 extends.

As the third preferred condition, it is proposed to make the distance W5 smaller than the width W1 of the opposing portion 32 of the main seal portion 31. As a result, prior to progression of separation of the main seal portion 31 from the inner edge of the opposing portion 32 to the outer edge, separation of the projecting seal portion 34 progresses to the cutout 28, so that the inside of the container 20 can be easily communicated with the outside via the cutout 28. Thus, it is possible to lower the pressure inside the container 20 before the opposing portion 32 completely separates. Accordingly, it is possible to suppress that the opposing portion 32 completely separates to discharge the contents from the lidded container at the position of the opposing portion 32.

As examples of elements provided in the flange portion 26 to make it easy to communicate the inside of the container 20 with the outside, besides the cutout 28 described above, a step portion 28a and a through hole 28b can be mentioned. Hereinafter, an example in which the step portion 28a is provided in the flange portion 26 and an example in which the through hole 28b is provided in the flange portion 26 will be described respectively.

Figure 10:
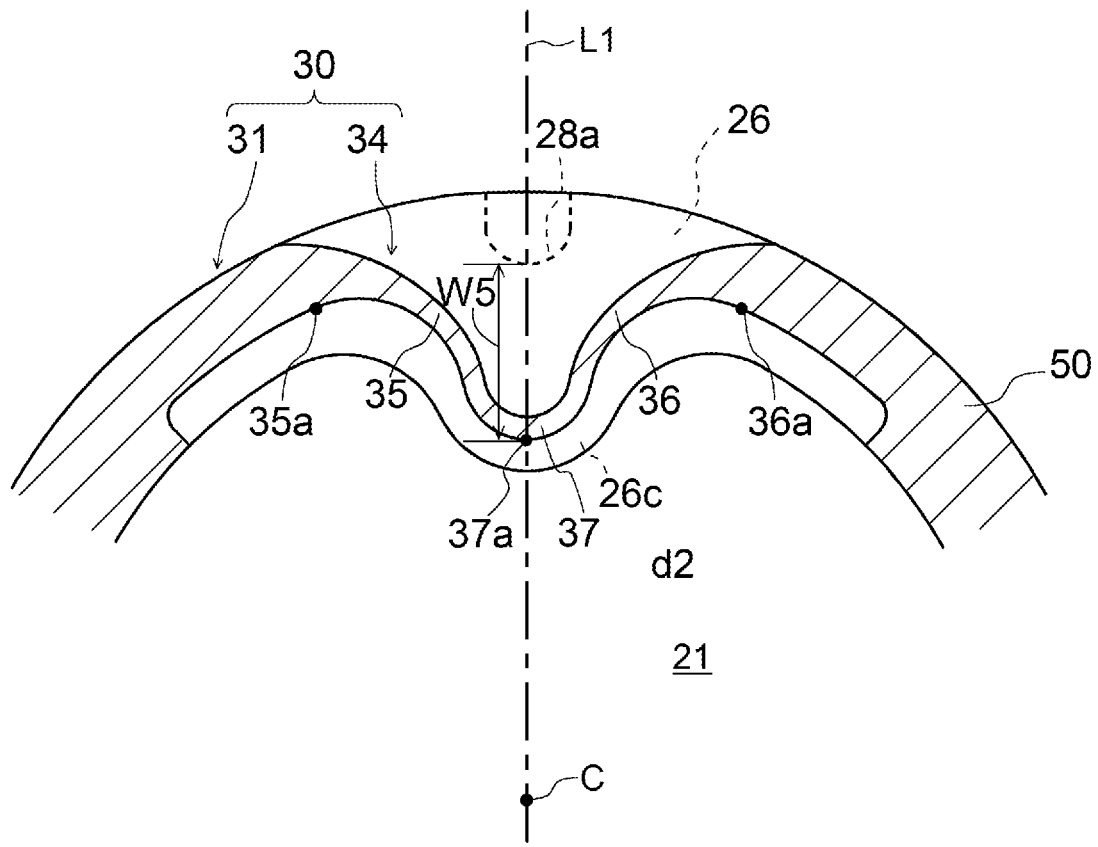
FIG. 10 is a plan view showing a modification of the lidded container satisfying a third preferred condition.
Figure 11:
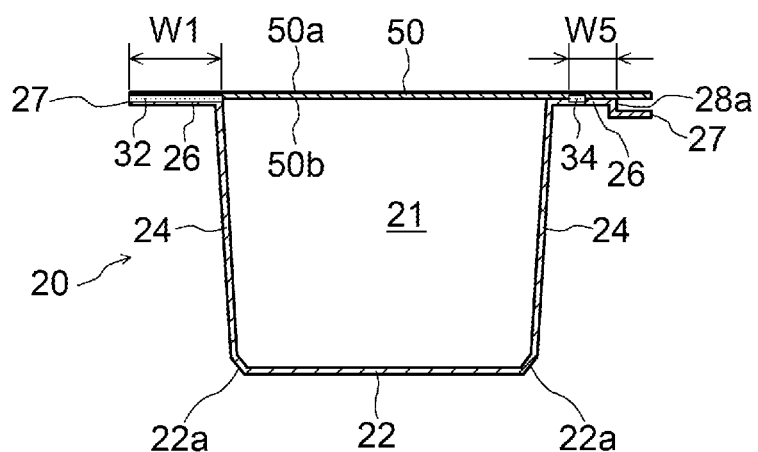
FIG. 11 is a cross-sectional view taken along a first center line of the lidded container of FIG. 10.

FIG. 10 is an enlarged plan view of the lidded container 10 in which the step portion 28a is provided in the flange portion 26. FIG. 11 is a cross-sectional view taken along the first center line L1 of the lidded container 10 of FIG. 10. The step portion 28a is a portion of the flange portion 26 which has transitioned to a lower surface 26b side relative to the surrounding portion. Similarly to the cutout 28, the step portion 28a is provided at a position outside the projecting seal portion 34 of the outer edge 27 of the flange portion 26. Preferably, the step portion 28a is provided so as to intersect with the first center line L1 in a plan view.

In the example shown in FIGS. 10 and 11, reference symbol W5 represents a distance between the inner edge of the leading end portion 37 of the projecting seal portion 34 and the step portion 28a in the direction in which the first center line L1 extends. Also in the present modification, by making the distance W5 smaller than the width W1 of the opposing portion 32 of the main seal portion 31, before the opposing portion 32 completely separates, the inside of the container 20 can be easily communicated with the outside via the step portion 28a. Accordingly, it is possible to suppress that the opposing portion 32 completely separates to discharge the contents from the lidded container at the position of the opposing portion 32.

Figure 12:
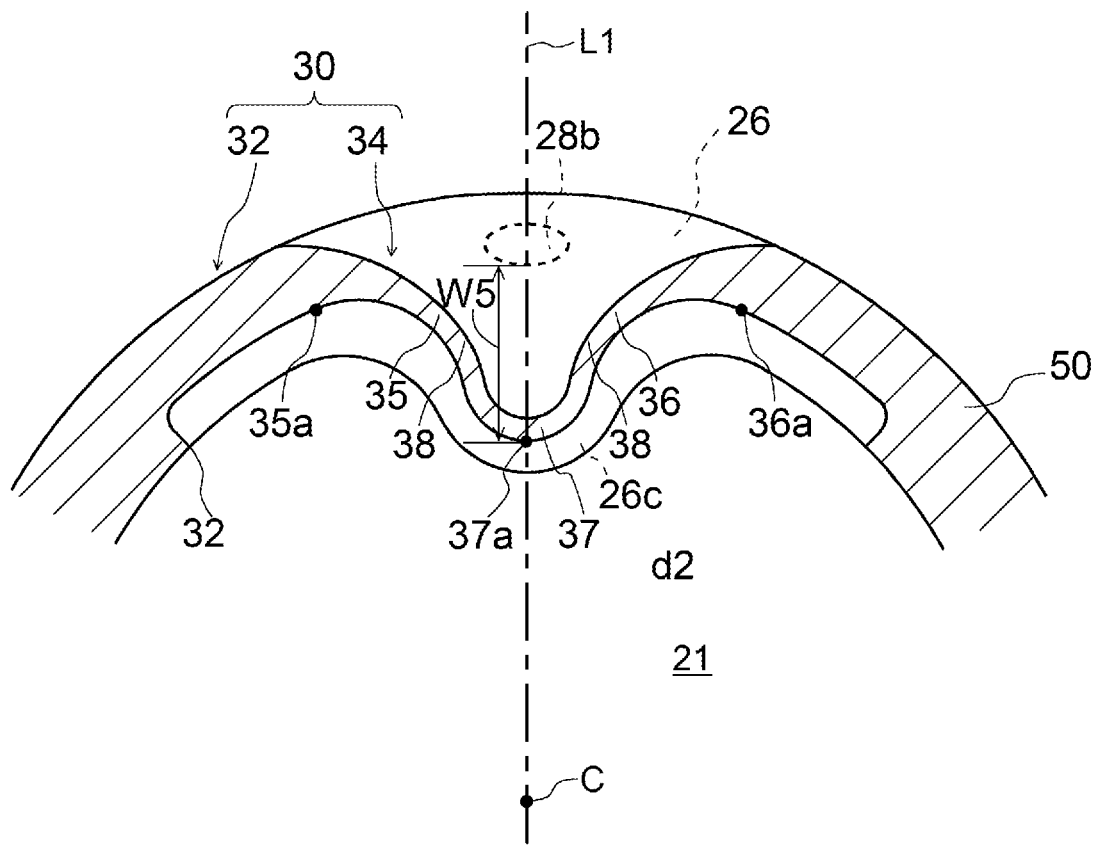
FIG. 12 is a plan view showing a modification of the lidded container satisfying the third preferred condition.
Figure 13:
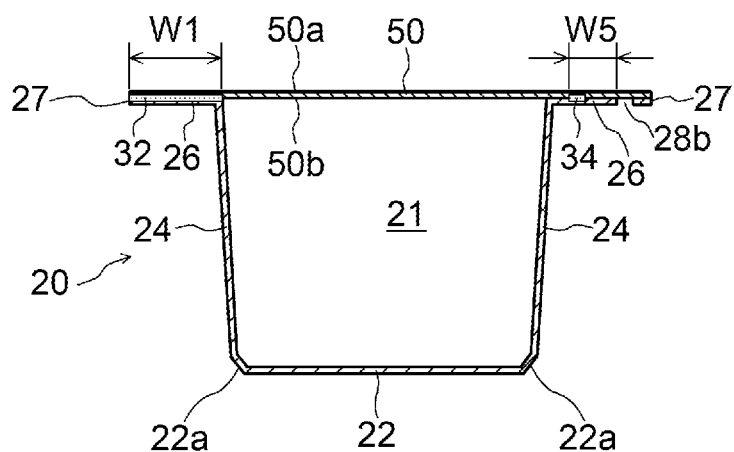
FIG. 13 is a cross-sectional view taken along a first center line of the lidded container of FIG. 12.

FIG. 12 is an enlarged plan view of the lidded container 10 in which the through hole 28b of the flange portion 26 is provided in the flange portion 26. FIG. 13 is a cross-sectional view taken along the first center line L1 of the lidded container 10 of FIG. 10. Similarly to the cutout 28, the through hole 28b is provided at a position outside the projecting seal portion 34 of the outer edge 27 of the flange portion 26. Preferably, the through hole 28b is provided so as to intersect with the first center line L1 in a plan view.

In the example shown in FIGS. 12 and 13, reference symbol W5 represents a distance between the inner edge of the leading end portion 37 of the projecting seal portion 34 and the through hole 28b in the direction in which the first center line L1 extends. Also in the present modification, by making the distance W5 smaller than the width W1 of the opposing portion 32 of the main seal portion 31, before the opposing portion 32 completely separates, the inside of the container 20 can be easily communicated with the outside via the through hole 28b. Accordingly, it is possible to suppress that the opposing portion 32 completely separates to discharge the contents from the lidded container at the position of the opposing portion 32.

The lidded container 10 may satisfy any of the first to third preferred conditions described above, or may satisfy a plurality of conditions at the same time.

Modifications

To be noted, various modifications can be made to the above embodiments. Hereinafter, modifications will be described with reference to the drawings as necessary. In the below description and the drawings used in the below description, a component that can be configured similarly to the above embodiment is indicated by the same reference number as that of the above embodiment, and overlapped description is omitted. When it is obvious that the operations and effects obtained in the above embodiments can also be obtained in the modifications, its description may be omitted.

(Modification of Bulging Portion)

Figure 14:
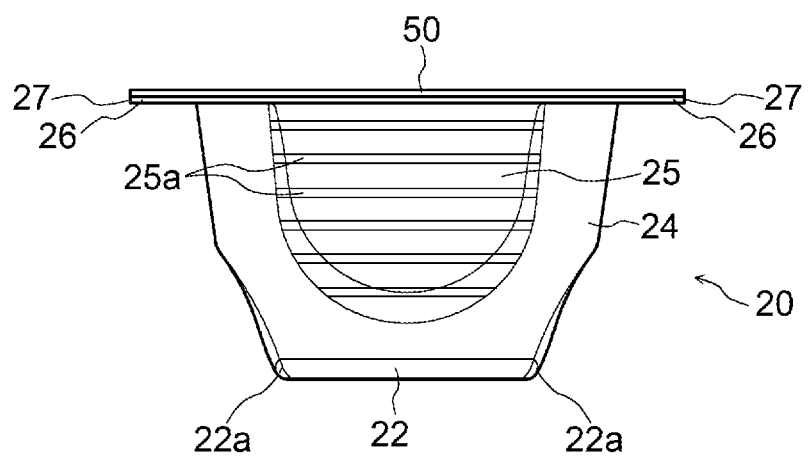
FIG. 14 is a side view showing a modification of the lidded container.

FIG. 14 is a view for explaining a modification of the bulging portion 25 of the container 20, and, as in the case of FIG. 5, FIG. 14 is a side view of the lidded container 10 as viewed along the arrow V of FIG. 1. As shown in FIG. 14, the bulging portion 25 may have on its surface a slip-preventing portion for preventing the user's fingers or the like from slipping against the bulging portion 25 when the user's fingers or the like are in contact with the bulging portion 25. The slip-preventing portion includes, for example, embossing applied to the surface of the bulging portion 25. For example, as shown in FIG. 14, a plurality of embossments 25a extending straight in the horizontal direction may be provided. The embossed portion of the bulging portion 25 is formed so as to project outward with respect to a portion not subjected to embossing.

Figure 15:
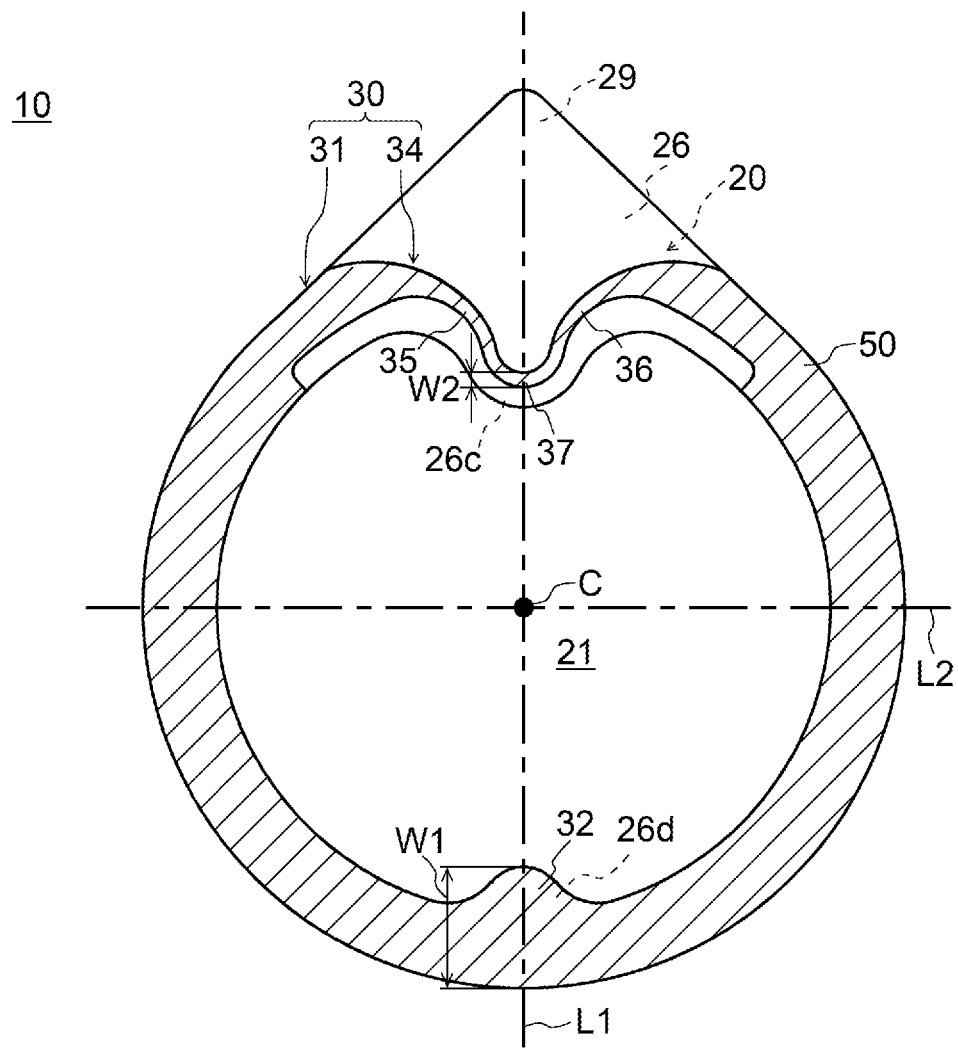
FIG. 15 is a plan view showing a modification of the lidded container.

(First Modification of Container) FIG. 15 is a view for explaining a first modification of the container 20, and is a plan view showing the lidded container 10. As shown in FIG. 15, the flange portion 26 of the container 20 may include a tab 29 projecting more outward than the other portions of the flange portion 26. The tab 29 is located outside the projecting seal portion 34.

Also in the present modification, by making the width W2 of the leading end portion 37 smaller than the width W1 of the opposing portion 32, it is possible to suppress that the opposing portion 32 separates prior to the leading end portion 37. This allows the contents to be taken out from the lidded container at a specific position. Also in the present modification, any one or more of the first to third preferred conditions described above may be satisfied.

(Second Modification of Container)

Figure 16:
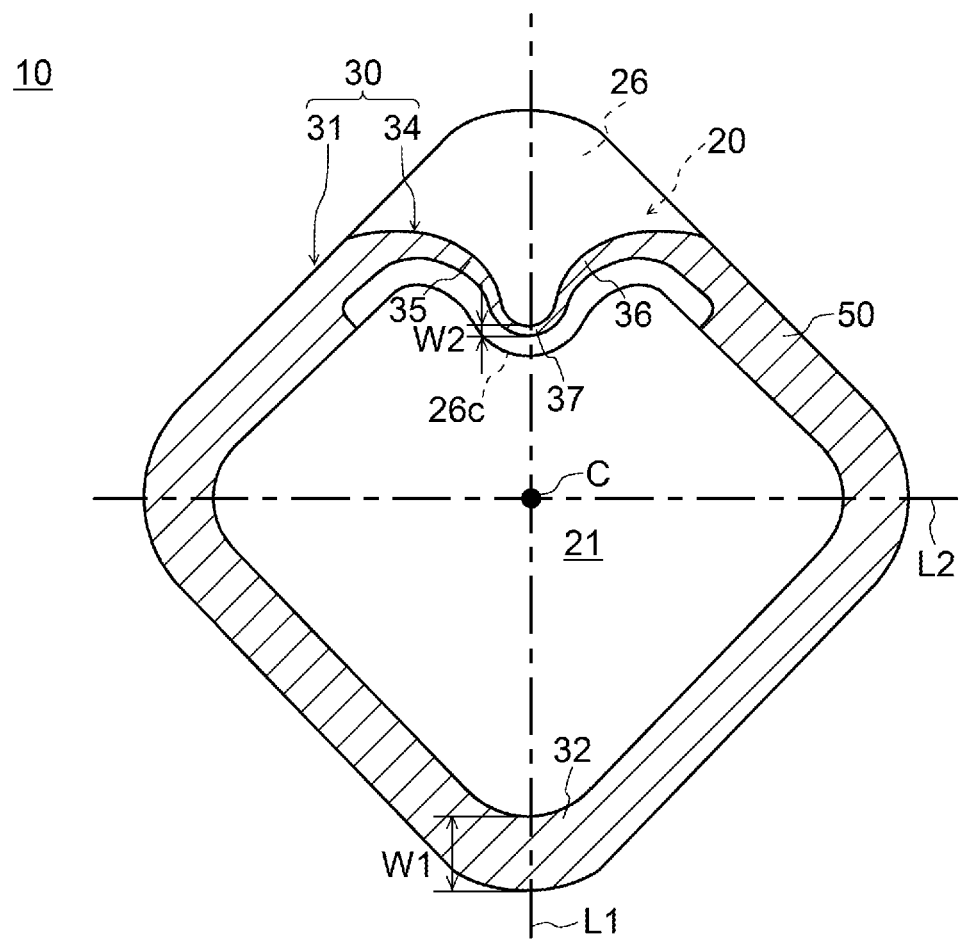
FIG. 16 is a plan view showing a modification of the lidded container.

FIG. 16 is a view for explaining a second modification of the container 20, and is a plan view showing the lidded container 10. As shown in FIG. 16, the flange portion 26 of the container 20 may have a rectangular shape in a plan view. In this case, the projecting seal portion 34 of the closing seal portion 30 is provided inside a corner portion of the flange portion 26. For example, the first center line L1 passing through the center point C of the opening 21 of the container 20 and the leading end portion 37 of the projecting seal portion 34 intersects with the corner portion of the flange portion 26 of the container 20. Also in the present modification, the main seal portion 31 is provided along the opening 21.

Also in the present modification, by making the width W2 of the leading end portion 37 smaller than the width W1 of the opposing portion 32, it is possible to suppress that the opposing portion 32 separates prior to the leading end portion 37. This allows the contents to be taken out from the lidded container at a specific position. Also in the present modification, any one or more of the first to third preferred conditions described above may be satisfied.

(Third Modification of Container)

As shown in FIG. 15, when the flange portion 26 includes the tab 29, a distance from the leading end portion 37 to the outer edge 27 of the flange portion 26 increases in the direction in which the first center line L1 extends. Thus, the lid 50 tends to come into close contact with the flange portion 26 at a position outside the leading end portion 37, and as a result, even if the leading end portion 37 is separated, it may be unable to take out the contents.

Figure 17:
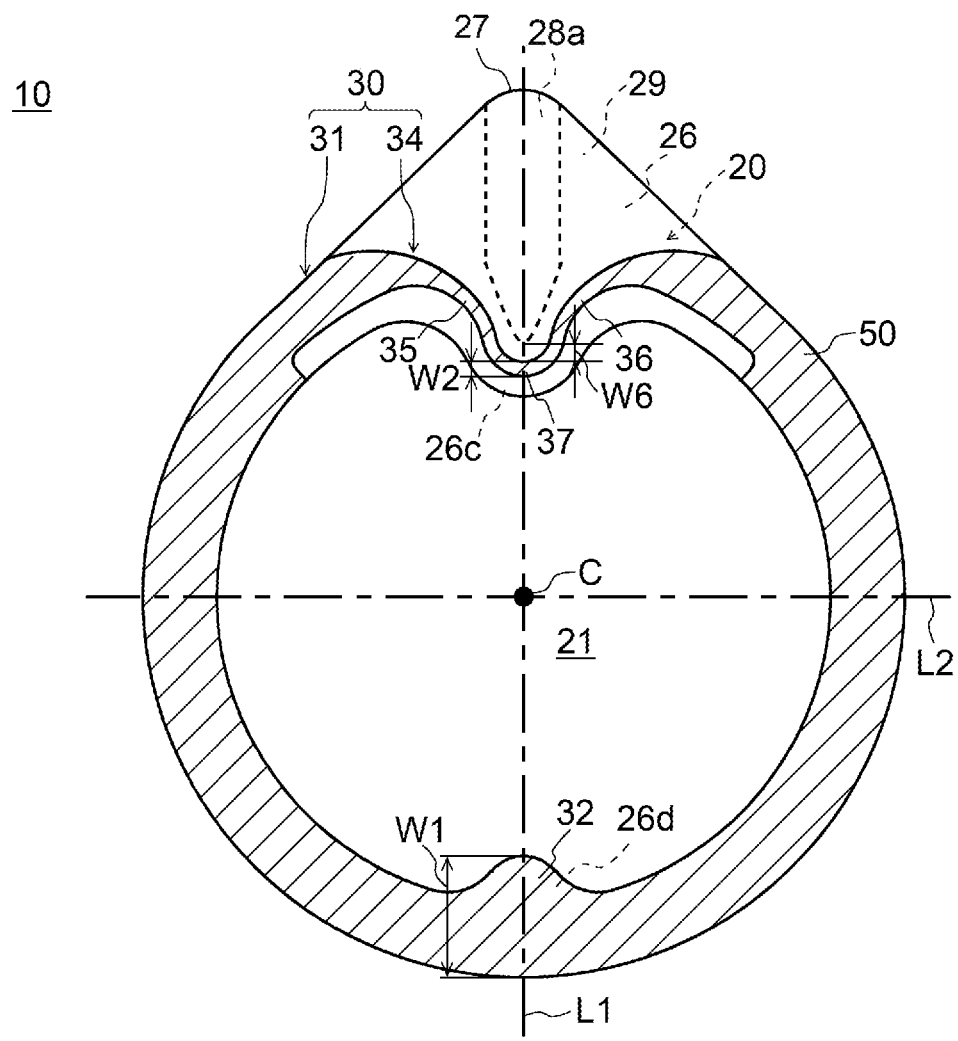
FIG. 17 is a plan view showing a modification of the lidded container.

In consideration of such a problem, in the present modification, as shown in FIG. 17, it is proposed to provide the step portion 28a in the tab 29 of the flange portion 26. As in the case of the example shown in FIG. 10, the step portion 28a is a portion of the flange portion 26 which has transitioned to the lower surface 26b side relative to the surrounding portion. The step portion 28a preferably extends in the same direction as the projecting direction of the tab 29.

For example, when the tab 29 projects in the direction in which the first center line L1 extends, the step portion 28a also extends in the direction in which the first center line L1 extends.

In FIG. 17, reference symbol W6 represents a distance between the leading end portion 37 and the step portion 28a in the direction in which the first center line L1 extends. The distance W6 is, for example, not more than 2 mm. When the distance W6 is set to not more than 2 mm, it is possible to suppress that the lid 50 comes into close contact with the flange portion 26 in a region between the leading end portion 37 and the outer edge 27 of the flange portion 26. Further, when the tab 29 is provided with the step portion 28a, the contents can be guided along the step portion 28a, whereby the contents can be easily poured from a specific position, for example, from the tip of the step portion 28a.

(First Modification of Seal Portion)

Figure 18:
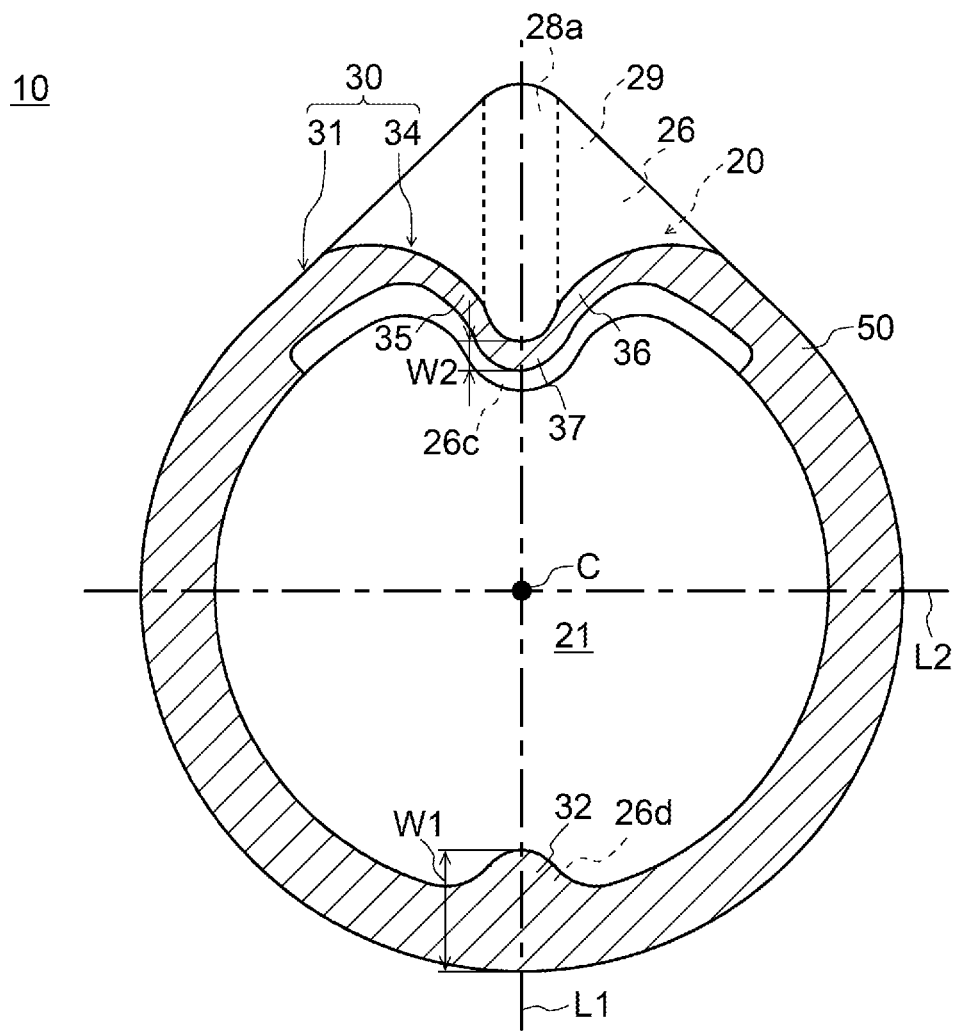
FIG. 18 is a plan view showing a modification of the lidded container.
Figure 19:
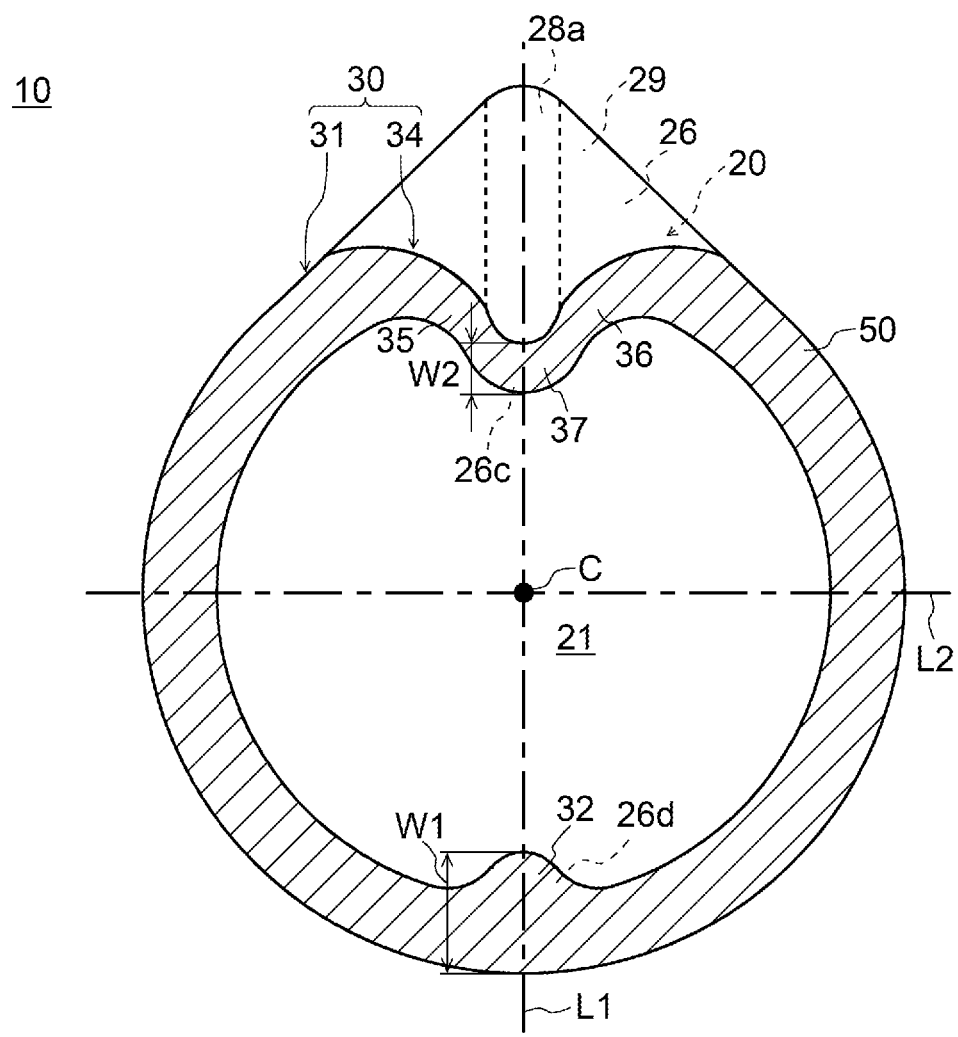
FIG. 19 is a plan view showing a modification of the lidded container.

In the example shown in FIG. 17, the distance between the leading end portion 37 and the step portion 28a in the direction in which the first center line L1 extends is more than 0 mm. However, the present invention is not limited to this example, and as shown in FIGS. 18 and 19, the distance between the leading end portion 37 and the step portion 28a in the direction in which the first center line L1 extends may be 0 mm. In other words, the leading end portion 37 and the step portion 28a may be in contact with each other in a plan view. In this case, as shown in FIG. 18, the inner edge of the leading end portion 37 and the inner edge of the flange portion 26 may not be in contact with each other, and as shown in FIG. 19, the inner edge of the leading end portion 37 and the inner edge of the flange portion 26 may be in contact with each other. Although not shown, when the flange portion 26 not including the tab 29 is provided with the step portion 28a, the leading end portion 37 and the step portion 28a may be in contact with each other in a plan view.

(Second Modification of Seal Portion)

Figure 20:
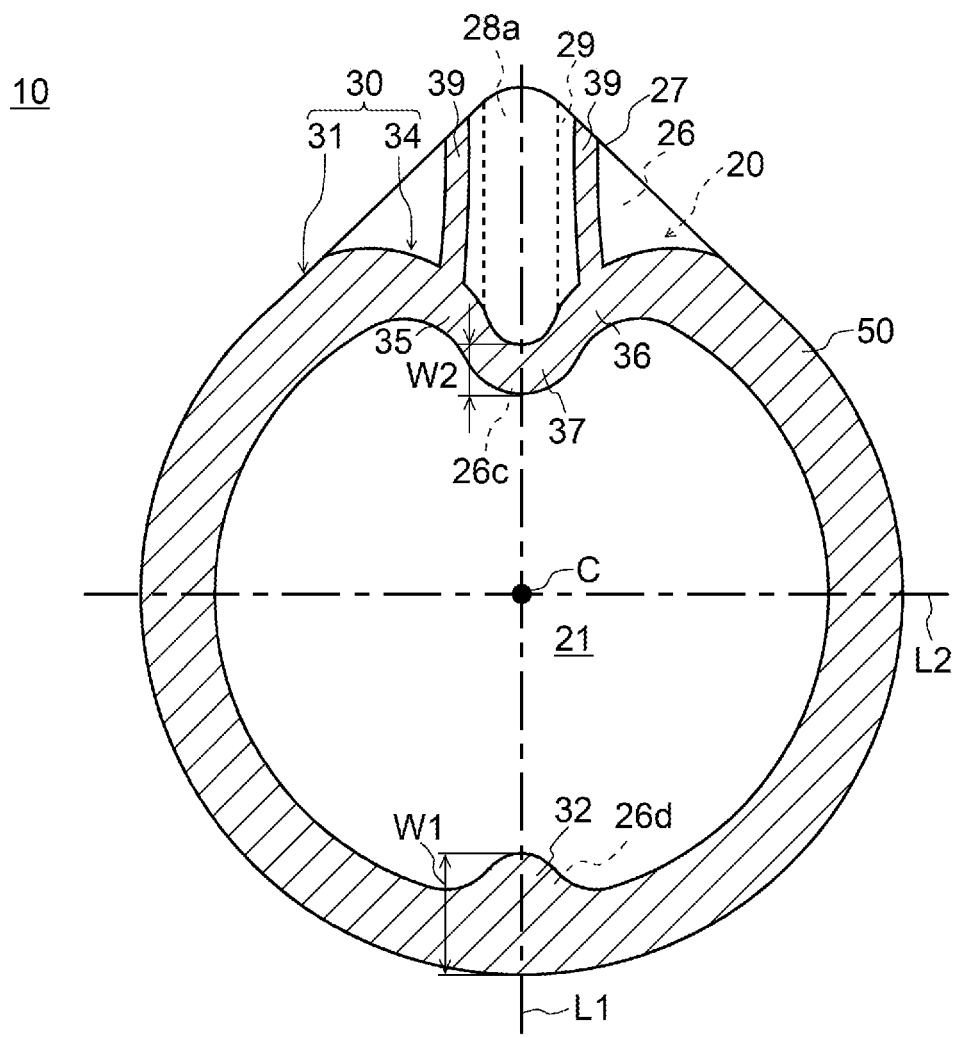
FIG. 20 is a plan view showing a modification of the lidded container.

As shown in FIG. 20, the seal portion joining the lid 50 to the container 20 may further include a pair of regulating seal portions 39 in addition to the closing seal portion 30 described above. The pair of regulating seal portions 39 is a seal portion which is provided so as to sandwich the first center line L1 in a plan view and is connected to a portion of the closing seal portion 30. In the example shown in FIG. 20, the pair of regulating seal portions 39 extends along the step portion 28a so as to sandwich the step portion 28a in a plan view. One ends of the pair of regulating seal portions 39 are respectively connected to the first projecting seal portion 35 and the second projecting seal portion 36. The other ends of the pair of regulating seal portions 39 reach the outer edge 27 of the flange portion 26. When the regulating seal portion 39 thus configured is provided, the pouring direction and the pouring position of the contents are easily determined. For example, even when the contents overflow from the step portion 28a when flowing toward the outer edge 27 of the flange portion 26, it is possible to suppress that the contents are poured out from an unintended position of the outer edge 27 of the flange portion 26.

(Third Modification of Seal Portion)

Figure 21:
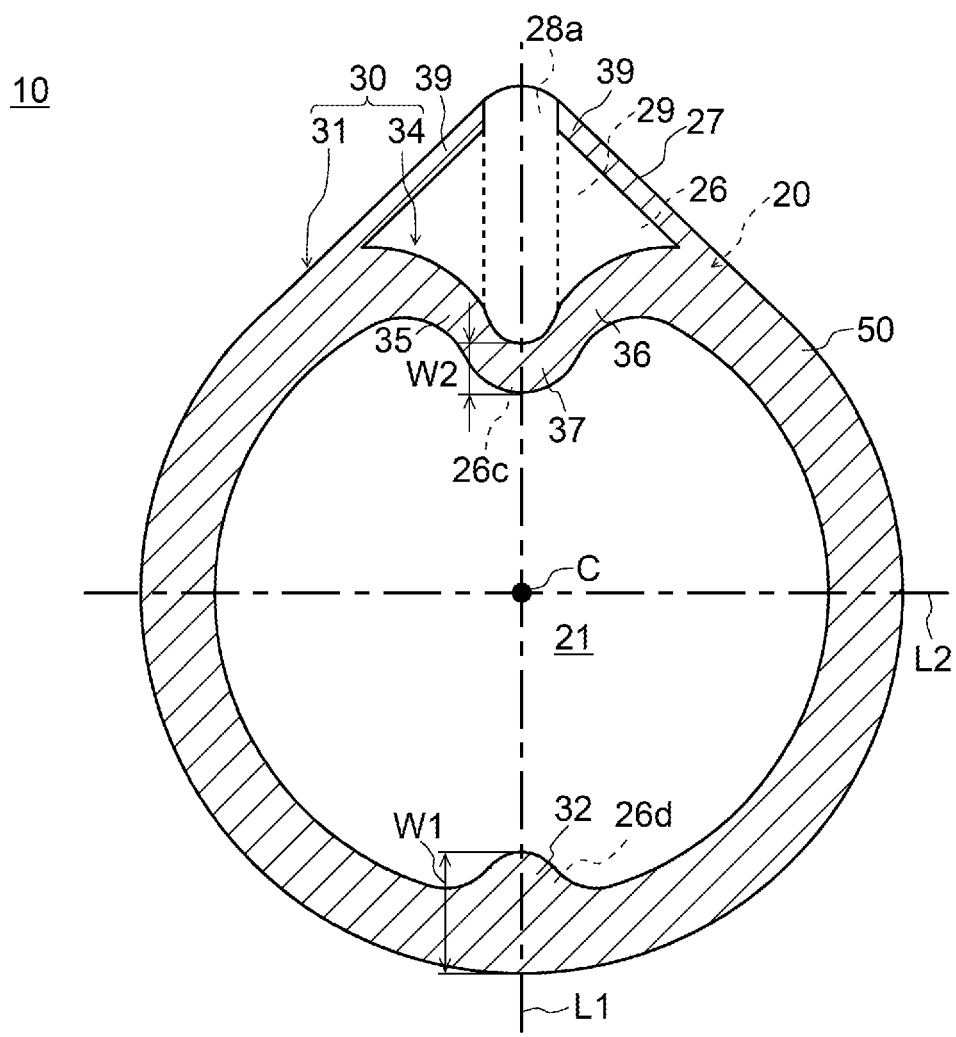
FIG. 21 is a plan view showing a modification of the lidded container.

In the example shown in FIG. 20, although the pair of regulating seal portions 39 extends along the step portion 28a, the present invention is not limited to this example. For example, as shown in FIG. 21, the pair of regulating seal portions 39 may extend along the outer edge 27 of the flange portion 26. In the example shown in FIG. 21, each of the pair of regulating seal portions 39 is connected to the main seal portion 31. Each of the pair of regulating seal portions 39 extends from the main seal portion 31 toward the step portion 28*a* along the outer edge 27 of the flange portion 26.

The regulating seal portion 39 shown in FIGS. 20 and 21 can also be provided in the lidded container 10 described in the above embodiment and each modification.

(Fourth Modification of Seal Portion)

FIGS. 20 and 21 show an example in which there is a region where the lid 50 and the upper surface 26*a* of the flange portion 26 are not joined at least partially between the regulating seal portion 39 and the step portion 28*a* in a plan view. However, the present invention is not limited to this example, and as shown in FIG. 22, the regulating seal portion 39 may be in contact with the step portion 28*a* over the entire region in a plan view.

Figure 22:
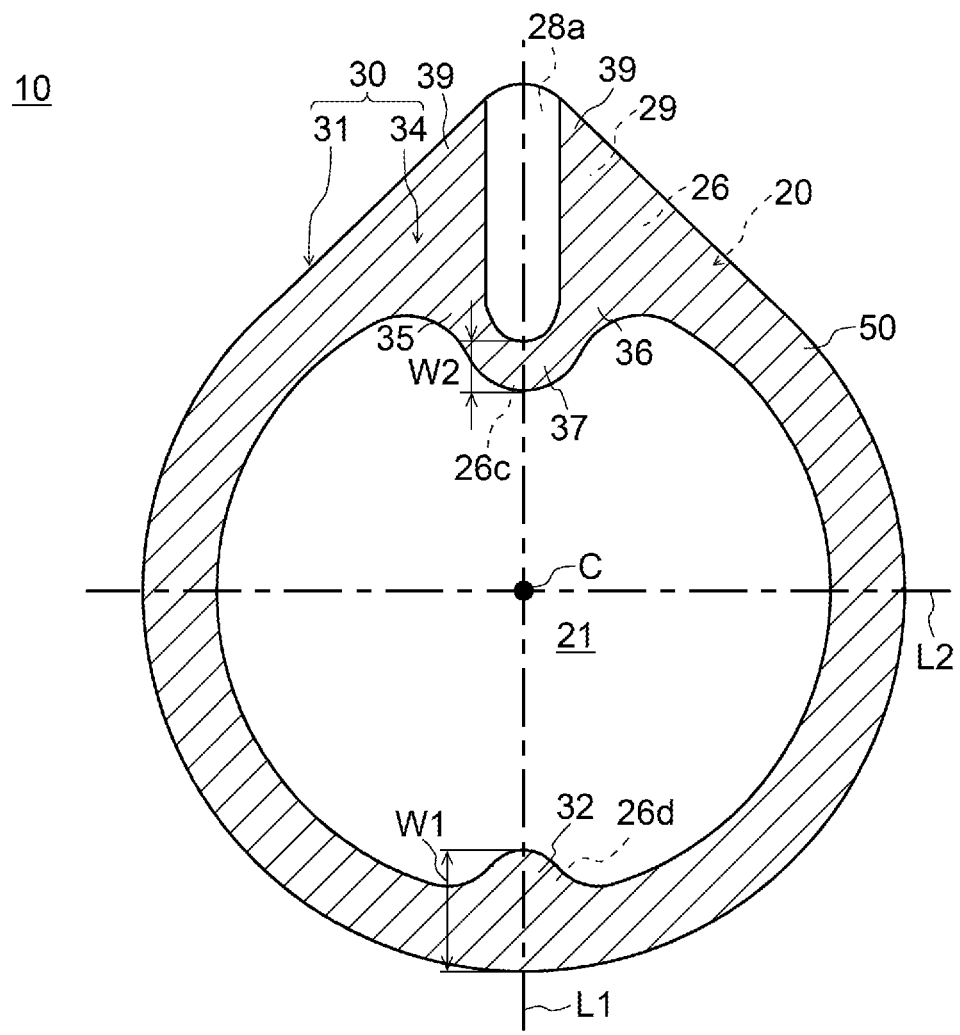
FIG. 22 is a plan view showing a modification of the lidded container.

Further, as shown in FIG. 22, the lid 50 and the upper surface 26*a* of the flange portion 26 may be joined not only between the regulating seal portion 39 and the step portion 28*a* but also in all other regions except for the step portion 28*a*. In this case, it is possible to use a flat hot plate in the process of welding the lid 50 to the upper surface 26*a* of the flange portion 26. In other words, it is unnecessary to prepare a hot plate having a protrusion corresponding to a pattern of a seal portion. In addition, the accuracy required for aligning the hot plate with respect to the container 20 and the lid 50 is reduced.

Consequently, it is possible to reduce the cost and time required for the process of welding the lid 50 to the upper surface 26*a* of the flange portion 26.

(Fourth Modification of Container)

Figure 23:
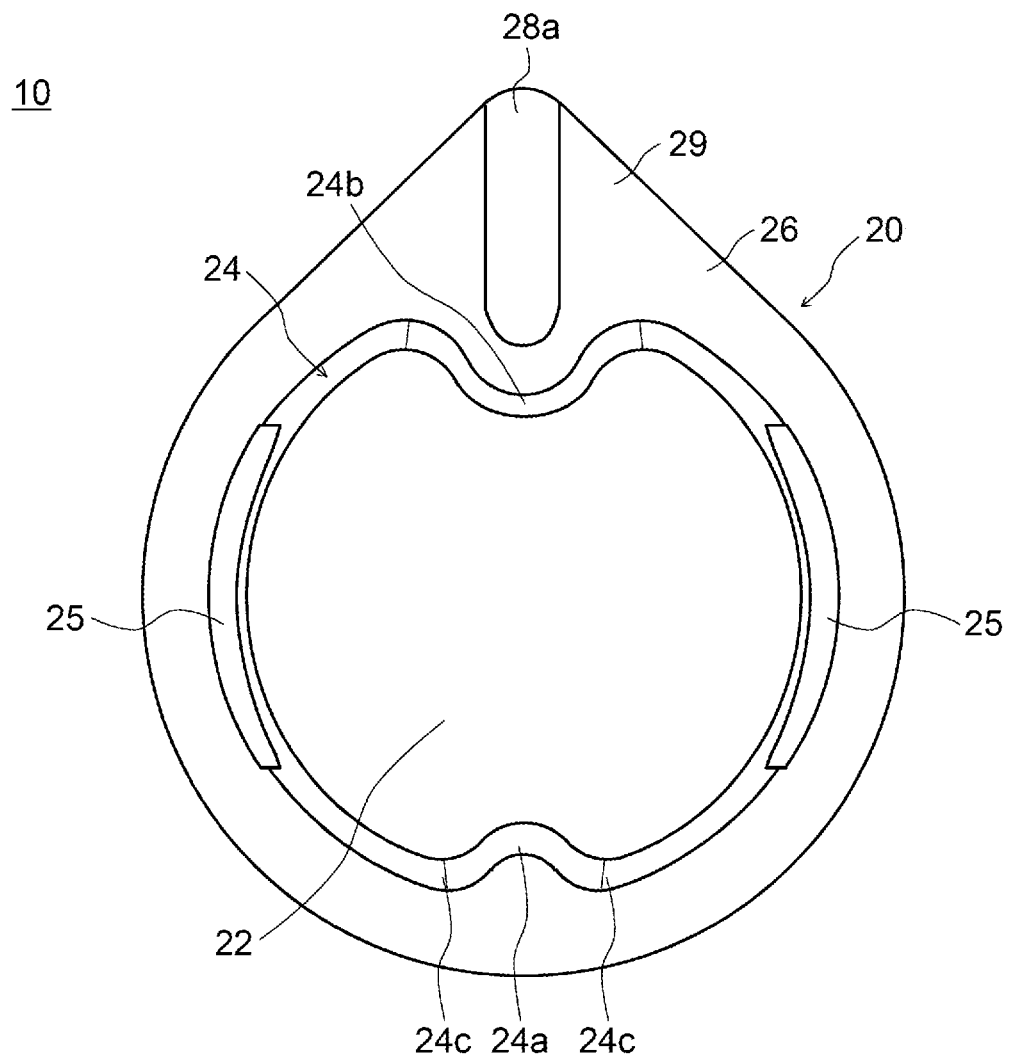
FIG. 23 is a bottom plan view showing a modification of the lidded container.

FIG. 23 is a bottom view showing the lidded container 10 according to the present modification. As shown in FIG. 23, a recess 24*a* recessed toward the center point C of the opening 21 is formed in a portion of the side surface 24 of the container 20 on the side opposite to a portion which faces the step portion 28*a*. A recess 24*b* recessed toward the center point C of the opening 21 may be formed in the portion of the side surface 24 of the container 20 which faces the step portion 28*a*. Both the recess 24*a* and the recess 24*b* extend vertically so as to reach the bottom surface 22.

Figure 24:
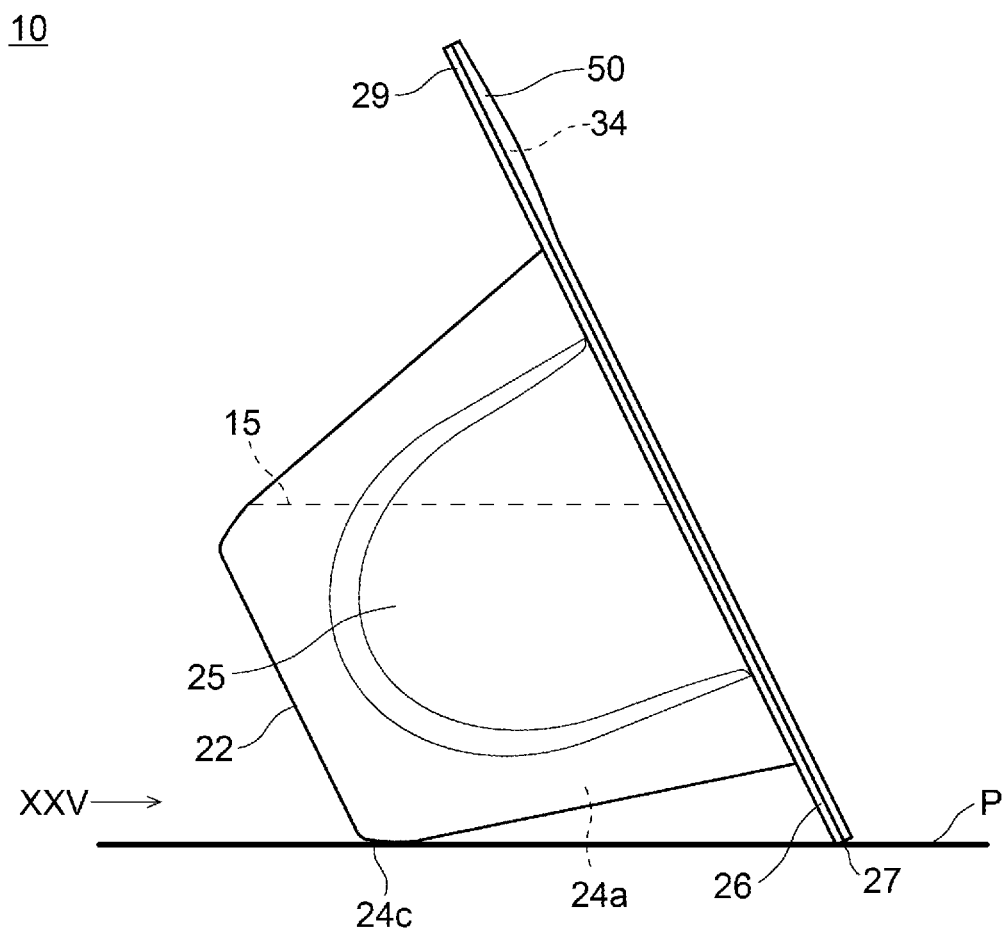
FIG. 24 is a side view showing a state in which the lidded container shown in FIG. 23 is placed on a placement surface with being inclined.
Figure 25:
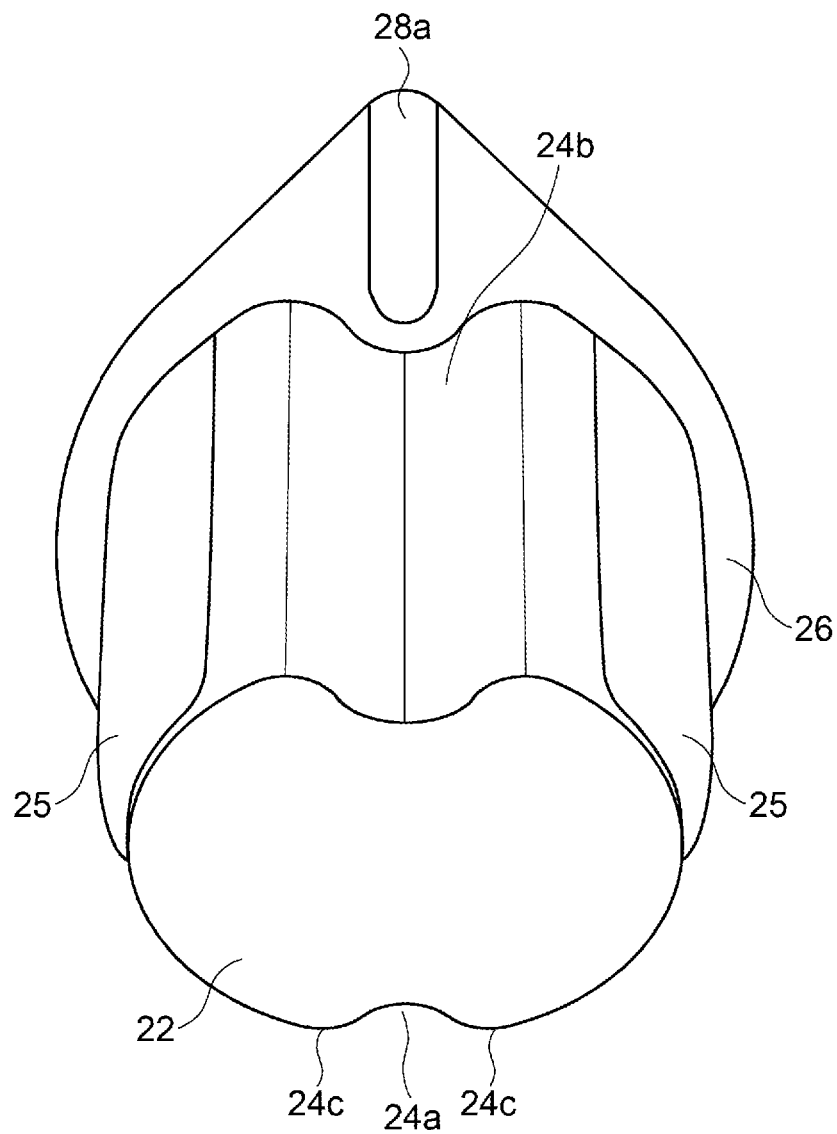
FIG. 25 is a view of the lidded container of FIG. 24 as viewed along an arrow XXV.

The advantage of providing the recess 24*a* on the side surface 24 will be described with reference to FIGS. 24 and 25. FIG. 24 is a side view of the lidded container 10 inclined so that the recess 24*a* is located downward. FIG. 25 is a view of the lidded container 10 of FIG. 24 as viewed along an arrow XXV.

When the recess 24*b* is provided in the side surface 24, paired protrusions 24*c* projecting more outward than the recess 24*b* are formed on both sides of the recess 24*b*. In this case, when the lidded container 10 is inclined so that the recess 24*a* is located downward, and placed on a predetermined placement surface P, as shown in FIGS. 24 and 25, the pair of protrusions 24*c* and the outer edge 27 of the flange portion 26 can be in contact with the placement surface P. That is, the lidded container 10 can be supported at at least three places. Thus, it is possible to stably maintain the state in which the lidded container 10 is inclined so that the recess 24*a* is located downward. Accordingly, for example, as shown in FIG. 24, after the lidded container 10 is opened, while contents 15 remain, when the lidded container 10 is inclined so that the tab 29 faces upward, and placed on the placement surface P, it is possible to suppress that the contents 15 leak out of the lidded container 10.

(Fifth Modification of Container)

Figure 26:
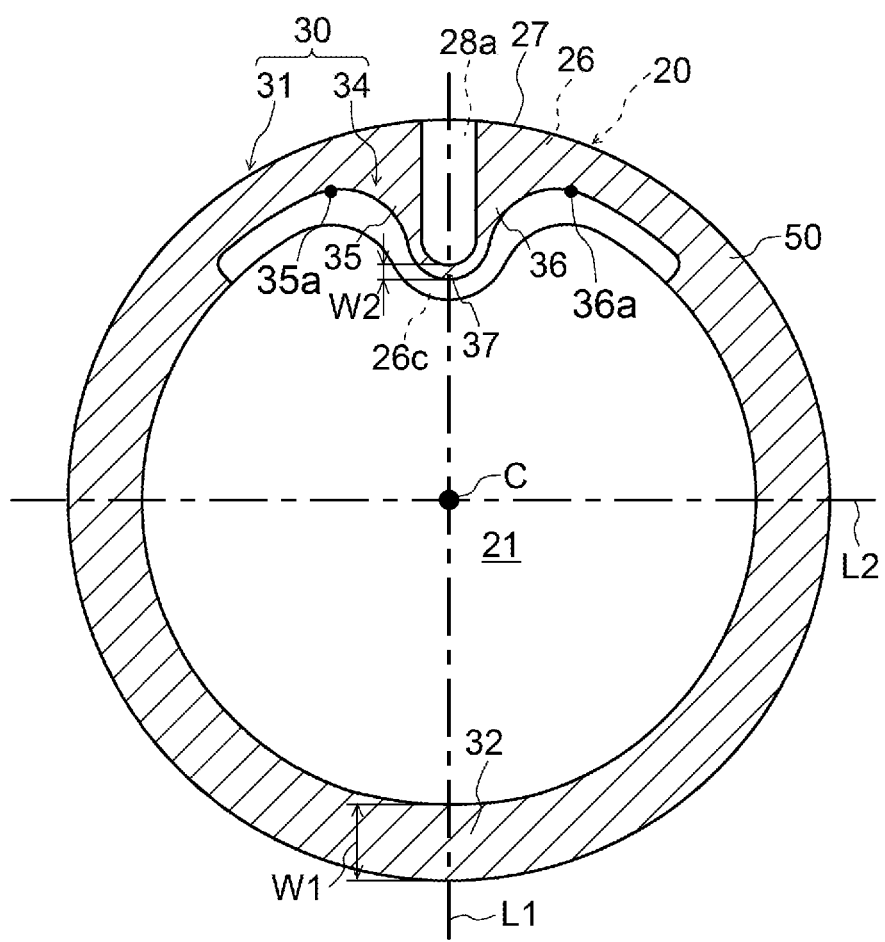
FIG. 26 is a plan view showing a modification of the lidded container.
Figure 27:
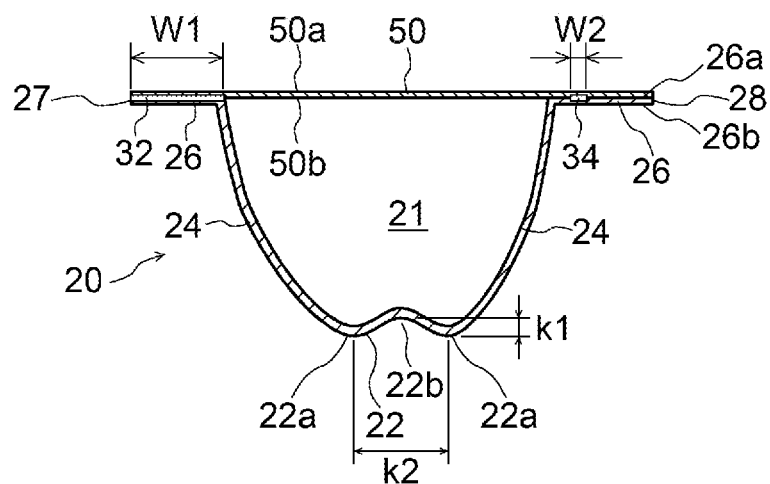
FIG. 27 is a cross-sectional view taken along a first center line of the lidded container of FIG. 26.

FIG. 26 is a plan view showing the lidded container 10 according to the present modification. FIG. 27 is a cross-sectional view taken along the first center line L1 of the lidded container of FIG. 26. In the example shown in FIG. 26, the flange portion 26 formed with the projecting seal portion 34 is not provided with the tab 29 but provided with the step portion 28*a*. The step portion 28*a* extends along the first center line L1 so as to be in contact with the leading end portion 37 in a plan view. Further, in the example shown in FIG. 26, the flange portion 26 formed with the opposing portion 32 is not provided with the projecting portion 26*d*.

In the present modification, as a method of using the lidded container 10, it is assumed that the user applies a force to the bottom surface 22 of the container 20 to separate the leading end portion 37 of the projecting seal portion 34. For example, as shown in FIG. 27, a recess 22*b* is formed on the bottom surface 22 of the container 20 so that a user can easily apply a force to the bottom surface 22 with a finger. The shape and size of the recess 22*b* are set such that a user can easily apply a force to the bottom surface 22 with a finger. For example, a maximum value of a depth k1 of the recess 22*b* is within the range of not less than 1 mm and not more than 10 mm, and a maximum value of a width k2 of the recess 22*b* is within the range of not less than 10 mm and not more than 20 mm.

Figure 28:
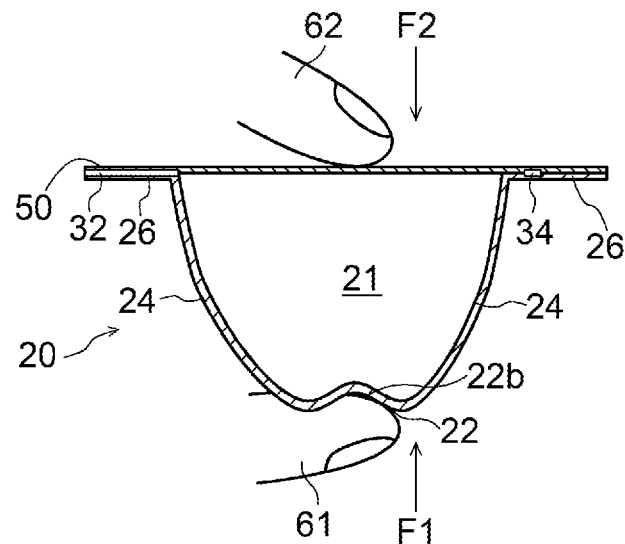
FIG. 28 is a view showing an example of a method of taking out contents from the lidded container of FIG. 26.

FIG. 28 is a view showing an example of a method of taking out the contents 15 from the lidded container 10 of the present modification. As shown in FIG. 28, first, a user places a thumb 61 on the recess 22*b* of the bottom surface 22 of the lidded container 10 and places an index finger 62 on the lid 50 of the lidded container 10. Subsequently, the user presses the lidded container 10 inwardly with the thumb 61 and the index finger 62, as indicated by arrows F1 and F2 in FIG. 28. As a result, the pressure inside the container 20 rises. This creates the force tending to peel the lid 50 from the flange portion 26 of the container 20.

Here, also in the present modification, as in the case of the above embodiment, the width W2 of the leading end portion 37 is smaller than the width W1 of the opposing portion 32. Thus, it is possible to suppress that the opposing portion 32 separates prior to the leading end portion 37. Accordingly, the leading end portion 37 is separated prior to the other portions of the closing seal portion 30, and it is possible to form a gap between the flange portion 26 of the container 20 and the lid 50 at the position of the leading end portion 37. This allows the contents to be taken out from the lidded container at an intended position, that is, at the position of the projecting seal portion 34.

Although not shown, the recess 22*b* shown in FIG. 27 may be formed in the bottom surface 22 of the container 20 described in the above embodiment or each modification.

(Sixth Modification of Container)

Figure 29:
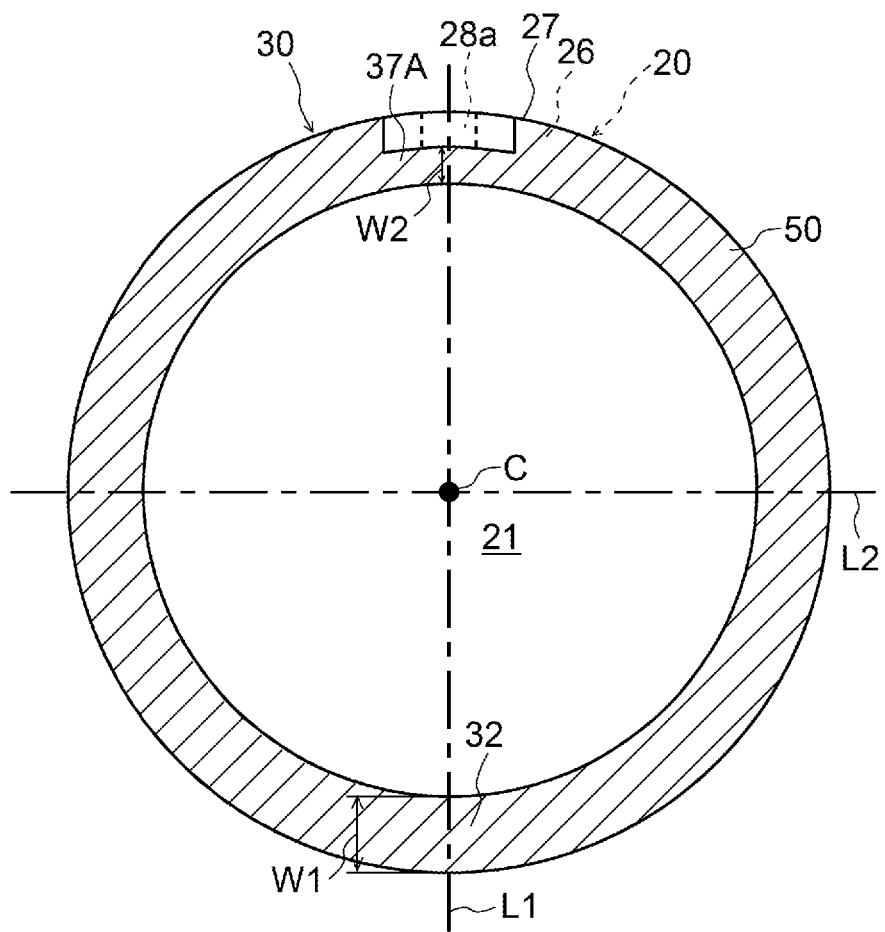
FIG. 29 is a plan view showing a modification of the lidded container.

FIG. 29 is a plan view showing the lidded container 10 according to the present modification. Also in the lidded container 10 shown in FIG. 29, as in the case of the lidded container 10 shown in FIG. 27, the recess 22*b* is formed in the bottom surface 22 of the container 20.

As shown in FIG. 28, when the pressure inside the container 20 is raised with the lid 50 pressed by a finger or the like, it is considered that the pressure acts equally on each portion of the closing seal portion 30 irrespective of the position. In this case, as shown in FIG. 29, the closing seal portion 30 may not have the projecting seal portion 34.

Also in the example shown in FIG. 29, the closing seal portion 30 includes a narrow-width portion 37A having a width smaller than the other portions. The narrow-width portion 37A has a width W2 smaller than the width W1 of the opposing portion 32 facing the narrow-width portion 37A with the center point C interposed therebetween. Thus, when the pressure inside the container 20 rises to peel off the closing seal portion 30, the inside of the container 20 communicates with the outside at the position of the narrow-width portion 37A at the earliest. Consequently, it is possible to suppress that the contents are discharged from the lidded container at an unintended position.

Preferably, as shown in FIG. 29, the step portion 28a, a cutout (not shown) and the like are provided outside the narrow-width portion 37A of the flange portion 26. As a result, the contents can be guided along the step portion 28a, and therefore, the contents can be easily poured from a specific position, for example, from the tip of the step portion 28a.

To be noted, the modifications described hereinabove may also be made in an appropriate combination to the above embodiments.

REFERENCE SIGNS LIST

10 Lidded container
15 Contents
20 Container
21 Opening
22 Bottom surface
24 Side surface
25 Bulging portion
26 Flange portion
27 Outer edge
28 Cutout
28a Step portion
28b Through hole
29 Tab
30 Closing seal portion
31 Main seal portion
32 Opposing portion
34 Projecting seal portion
35 First projecting seal portion
36 Second projecting seal portion
37 Leading end portion
38 Intermediate portion
39 Regulating seal portion
40 Virtual seal portion
50 Lid
L1 First center line
L2 Second center line
P Placement surface

The invention claimed is:

1. A lidded container comprising:
a container having a bottom surface, a side surface standing upright from the bottom surface and defining an opening, and a flange portion continuously connected to an upper portion of the side surface so as to surround the opening;
a lid covering the opening of the container; and
a closing seal portion located between an upper surface of the flange portion of the container and a lower surface of the lid and joining the lid to the flange portion of the container,
wherein the closing seal portion comprises a main seal portion having a first end and a second end and a projecting seal portion having one end connected to the first end of the main seal portion and the other end connected to the second end of the main seal portion and projecting toward the opening of the container,
the full length of the projecting seal portion is positioned between the lower surface of the lid and the upper surface of the flange in a direction perpendicular to the upper surface of the flange,
a width of a leading end portion which is a portion of the projecting seal portion, which is closest to a center point of the opening of the container, is smaller than a width of an opposing portion which is a portion of the main seal portion, which intersects with a center line passing through the leading end portion of the projecting seal portion and the center point of the opening of the container,
a cutout, a step portion, or a through hole is formed in the flange portion of the container at a position outside the projecting seal portion, and
a distance between an inner edge of the leading end portion of the projecting seal portion and the cutout, the step portion, or the through hole of the container in the direction in which the center line extends is smaller than the width of the opposing portion of the main seal portion.

2. The lidded container according to claim 1, wherein a difference between the width of the leading end portion and the width of the opposing portion is not less than 2 mm.

3. The lidded container according to claim 1, wherein when a seal portion in a case where it is assumed that the main seal portion is virtually extended from the first end to the second end of the main seal portion based on a direction in which the main seal portion extends in the first end and the second end of the main seal portion is referred to as a virtual seal portion, a distance between an inner edge of a portion of the virtual seal portion which intersects with the center line and an inner edge of the leading end portion of the projecting seal portion is smaller than a width of the opposing portion of the main seal portion.

4. The lidded container according to claim 1, wherein when a portion of the projecting seal portion in which a distance between opposing outer edges of the projecting seal portion in a direction orthogonal to the center line is 5 mm is referred to as an intermediate portion, a distance between an inner edge of the leading end portion of the projecting seal portion and the intermediate portion of the projecting seal portion in a direction in which the center line extends is smaller than the width of the opposing portion of the main seal portion.

5. The lidded container according to claim 1, wherein the step portion is formed in the flange portion of the container at the position outside the projecting seal portion, and the step portion extends in a direction in which the center line passing through the leading end portion of the projecting seal portion and the center point of the opening of the container extends.

6. The lidded container according to claim 5, wherein in a plan view, the projecting seal portion is in contact with the step portion.

7. The lidded container according to claim 1, further comprising a pair of regulating seal portions provided so as to sandwich the center line, passing through the leading end portion of the projecting seal portion and the center point of the opening of the container, in a plan view and connected to a portion of the closing seal portion.

8. The lidded container according to claim 1, wherein the side surface of the container has a thickness of not less than 100 μm and not more than 500 μm.

9. A lidded container comprising:
a container having a bottom surface, a side surface standing upright from the bottom surface and defining an opening, and a flange portion continuously connected to an upper portion of the side surface so as to surround the opening;
a lid covering the opening of the container; and a closing seal portion located between an upper surface of the flange portion of the container and a lower surface of the lid and joining the lid to the flange portion of the container, wherein the closing seal portion comprises a main seal portion having a first end and a second end and a projecting seal portion having one end connected to the first end of the main seal portion and the other end connected to the second end of the main seal portion and projecting toward the opening of the container, a width of a leading end portion which is a portion of the projecting seal portion, which is closest to a center point of the opening of the container, is smaller than a width of an opposing portion which is a portion of the main seal portion, which intersects with a center line passing through the leading end portion of the projecting seal portion and the center point of the opening of the container, a flange cutout, a step portion, or a through hole is formed in the flange portion of the container at a position outside the projecting seal portion, and a distance between an inner edge of the leading end portion of the projecting seal portion and the flange cutout, the step portion, or the through hole of the container in the direction in which the center line extends is smaller than the width of the opposing portion of the main seal portion.

\* \* \* \* \*